United States Patent
Murayama et al.

(10) Patent No.: US 12,259,684 B2
(45) Date of Patent: Mar. 25, 2025

(54) MAGNETIC CARRIER, TWO-COMPONENT DEVELOPER, AND REPLENISHMENT DEVELOPER

(71) Applicant: CANON KABUSHIKI KAISHA, Tokyo (JP)

(72) Inventors: Ryuji Murayama, Chiba (JP); Hironori Minagawa, Ibaraki (JP); Yuto Onozaki, Saitama (JP); Nobuhiro Yoshida, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 672 days.

(21) Appl. No.: 17/581,433

(22) Filed: Jan. 21, 2022

(65) Prior Publication Data

US 2022/0236660 A1 Jul. 28, 2022

(30) Foreign Application Priority Data

Jan. 28, 2021 (JP) .................. 2021-012506
Dec. 20, 2021 (JP) .................. 2021-206050

(51) Int. Cl.
    *G03G 9/113* (2006.01)
    *C08F 299/08* (2006.01)
    *G03G 9/107* (2006.01)

(52) U.S. Cl.
    CPC .......... *G03G 9/1136* (2013.01); *C08F 299/08* (2013.01); *G03G 9/1085* (2020.08)

(58) Field of Classification Search
    None
    See application file for complete search history.

(56) References Cited

U.S. PATENT DOCUMENTS

| 6,130,019 A | 10/2000 | Nishikawa et al. |
| 2011/0091802 A1 | 4/2011 | Takahashi et al. |
| 2012/0322004 A1* | 12/2012 | Shoji .................. G03G 9/1136 430/137.13 |
| 2018/0275547 A1 | 9/2018 | Nomiya et al. |

FOREIGN PATENT DOCUMENTS

| JP | 2002091093 A | 3/2002 |
| JP | 2013003428 A | 1/2013 |
| JP | 2015138230 A | 7/2015 |

* cited by examiner

*Primary Examiner* — Peter L Vajda
*Assistant Examiner* — Charles Collins Sullivan, IV
(74) *Attorney, Agent, or Firm* — Canon U.S.A., Inc. I.P. Division

(57) ABSTRACT

A magnetic carrier including: a magnetic core; and a coating resin that coats a surface of the magnetic core, wherein the resin coating layer has a thickness of 50 nm or more, a coating resin, which forms the resin coating layer, contains a resin S having an organosilicon polymer moiety, and when a surface and a position at a depth of 20 nm from the surface of the magnetic carrier are analyzed by X-ray photoelectron spectroscopy, an amount of silicon element as determined by the analysis has a ratio within a specific range at respective positions.

13 Claims, 4 Drawing Sheets

MAGNETIC CARRIER, TWO-COMPONENT DEVELOPER, AND REPLENISHMENT DEVELOPER

BACKGROUND OF THE INVENTION

Field of the Invention

The present disclosure relates to a magnetic carrier, a two-component developer, and a replenishment developer to be used for an image forming method using electrophotography to visualize an electrostatic image.

Description of the Related Art

A conventional method generally used for the electrophotographic image forming method is a method in which a variety of devices are used to form an electrostatic latent image on an electrostatic latent image-bearing member, and a toner is adhered to this electrostatic latent image, thereby developing the electrostatic latent image. In the development of this electrostatic latent image, widely employed is a two-component developing method in which a carrier particle called a magnetic carrier is mixed with a toner, thereby generating a triboelectric charge to provide an appropriate amount of positive or negative charge to the toner, and the toner uses the charge as a driving force to develop the image.

In the two-component developing method, such function as stirring, conveying, or charging of the developer can be provided to the magnetic carrier, and the division of functions between the magnetic carrier and the toner is clear. For this reason, the two-component developing method has some advantages such as an excellent controllability over the developer performance. This method often has a configuration that the magnetic carrier includes: a core provided with a magnetic property to acquire conveyability; and a coating resin to acquire toner charging ability, and the core is coated with the coating resin.

In recent years, a long life of main unit is required at a higher level by the technological progress in the field of electrophotography, and the magnetic carrier is required to preserve its charging ability even for a long service life. However, there is a disadvantage in the long service life that a toner component generally adheres to a magnetic carrier, thereby reducing its charging sites, and thus the charging ability of the magnetic carrier is decremented.

When the charging ability of the magnetic carrier is decremented, a percentage of the toner having an insufficient charge amount is increased, whereby a stable developability cannot be obtained. As a result of this, there may be a case where the electrostatic latent image may not be sufficiently developed, and thus a stable image density cannot be obtained. Furthermore, when the percentage of the toner having an insufficient charge amount is increased, there may be a case where the toner is not appropriately transferred to a transfer unit, and as a result, a fogging may be occurred.

Furthermore, when the charging ability of the magnetic carrier is decremented, an overall charge amount of the toner is decreased, and a percentage of a toner having an extremely small charge amount is increased. The toner having an extremely small charge amount has an extremely weak electrostatic adhesion force to the magnetic carrier, and thus the toner is likely to be separated from the magnetic carrier at the time when the toner and the magnetic carrier are stirred in the developing unit, resulting in a remarkable member pollution due to the scattering of the toner.

Hence, the magnetic carrier is needed to be provided with a durability characteristic (hereinafter referred to as a stain resistance) against the adhesion of a toner component in order to suppress the above-described several disadvantages due to the decremented charging ability.

As a method of providing a stain resistance to a magnetic carrier, there is proposed a method of using a resin having a silicone structure, as a material having a low surface free energy, for a coating resin included in the magnetic carrier. In Japanese Patent Application Laid-Open No. 2002-91093, there is a disclosure to use a silicone resin for a coating resin. In addition, in Japanese Patent Application Laid-Open No. 2015-138230, there is a disclosure to use a silicone-modified resin having a terminal bonded to a tri-functional silicon for a coating resin. Furthermore, in Japanese Patent Application Laid-Open No. 2013-3428, there is a disclosure to use a resin having a side chain including a silicone structure for a coating resin.

However, even in a case where the magnetic carrier described in Japanese Patent Application Laid-Open No. 2002-91093, Japanese Patent Application Laid-Open No. 2015-138230, or Japanese Patent Application Laid-Open No. 2013-3428 was used, there has been a demand for further improvement for the stability of image density and developability in the long service life and for the suppression of fogging and toner scattering.

SUMMARY OF THE INVENTION

Hence, an aspect of the present disclosure is to provide a magnetic carrier with which a high level of stability on image density and developability can be obtained in the long service life and which is excellent in the suppression of fogging and toner scattering.

A magnetic carrier according to an aspect of the present disclosure is a magnetic carrier including: a magnetic core; and a resin coating layer to coat a surface of the magnetic core, wherein the resin coating layer has a thickness of 50 nm or more, and a coating resin to form the resin coating layer contains a resin S having an organosilicon polymer moiety, and when a ratio of an amount of silicon element to a sum total of an amount of nitrogen element, an amount of silicon element, an amount of fluorine element, an amount of carbon element, an amount of titanium element, an amount of strontium element, an amount of tin element, an amount of aluminum element, and an amount of oxygen element as determined when the surface of the magnetic carrier is analyzed by X-ray photoelectron spectroscopy is denoted by S0 (atomic percentage), S0 is 1.0 or more and 15.0 or less, and when a ratio of an amount of silicon element to a sum total of an amount of nitrogen element, an amount of silicon element, an amount of fluorine element, an amount of carbon element, an amount of titanium element, an amount of strontium element, an amount of tin element, an amount of aluminum element, and an amount of oxygen element as determined when a position at a depth of 20 nm from the surface of the magnetic carrier is analyzed by X-ray photoelectron spectroscopy is denoted by S20 (atomic percentage), S20 is 0.0 or more and 5.0 or less.

In addition, a two-component developer according to another aspect of the present disclosure is a two-component developer to develop an electrostatic latent image formed on an electrostatic latent image-bearing member, wherein the two-component developer includes the magnetic carrier and a toner.

Furthermore, a replenishment developer according to still another aspect of the present disclosure is a replenishment developer to be replenished into a developing unit in accordance with a decrease of toner concentration of a two-component developer included in the developing unit, wherein the replenishment developer includes the magnetic carrier and a toner.

Further features of the present disclosure will become apparent from the following description of exemplary embodiments with reference to the attached drawings.

DESCRIPTION OF THE EMBODIMENTS

Figure 1:
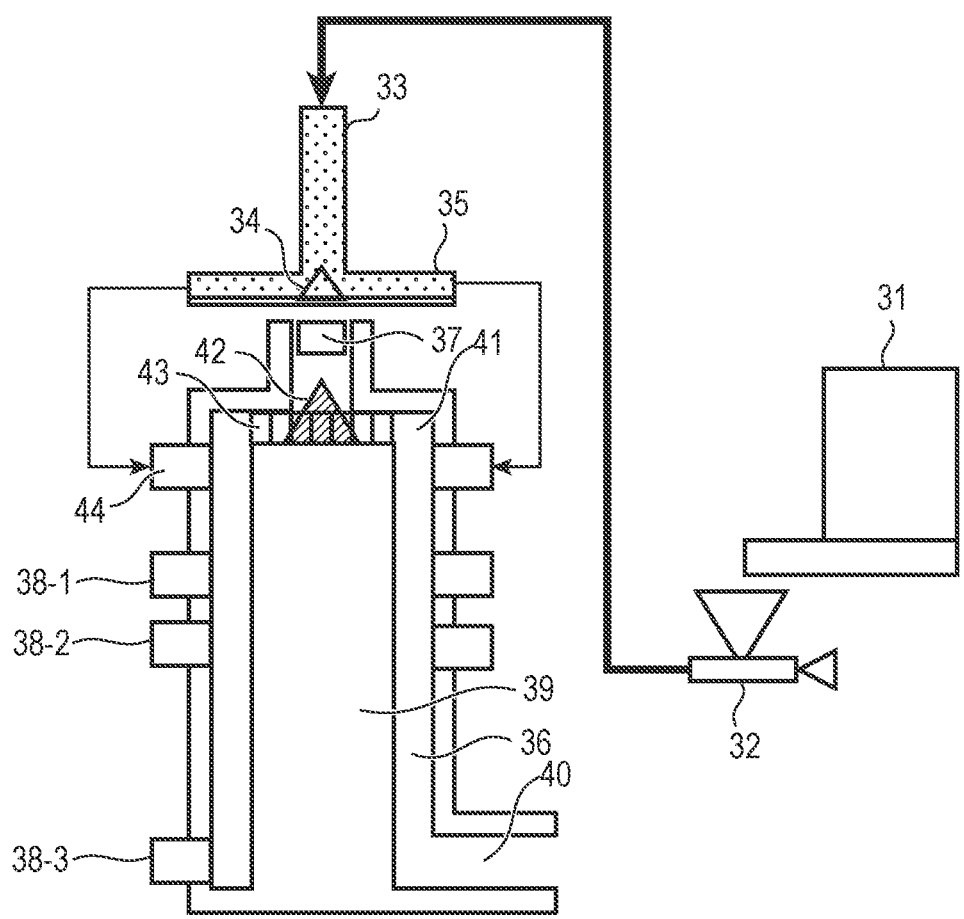
FIG. 1 is a schematic view illustrating a surface treatment apparatus to be used for surface treatment of a toner particle.

Preferred embodiments of the present disclosure will now be described in detail in accordance with the accompanying drawings.

As used in the present disclosure, an expression of "XX or more and YY or less" or "from XX to YY" indicating a numerical range means a numerical range including its end points as a lower limit and an upper limit unless otherwise specified.

Both the silicone resin used for the coating resin in Japanese Patent Application Laid-Open No. 2002-91093 and the resin having a side chain including the silicone structure used for the coating resin in Japanese Patent Application Laid-Open No. 2013-3428 are materials capable of significantly reducing their surface free energy. It is considered that an adhesion of a toner component or the like to the magnetic carrier can be effectively suppressed when these resins are used for the coating resin.

On the other hand, however, since in a material, such as a silicone resin, with which the surface free energy is highly effectively reduced, an interaction between the molecules is weak in general, such material has a property of being easily broken by an external force or the like. For this reason, in the case of using the magnetic carrier described in Japanese Patent Application Laid-Open No. 2002-91093 or Japanese Patent Application Laid-Open No. 2013-3428, the coating resin is likely to be worn by a mechanical load or the like generated at the time of being stirred in a developing unit or at the time of being conveyed. When the coating resin is worn, the surface resistance of the magnetic carrier decreases, which causes a decrease of the charging ability of the magnetic carrier. For this reason, it can be considered that there has been a demand for a further improvement in the stability of image density and developability in the long service life and the suppression of fogging and toner scattering even in a case of using the magnetic carrier described in Japanese Patent Application Laid-Open No. 2002-91093 or Japanese Patent Application Laid-Open No. 2013-3428.

The silicone-modified resin having a terminal bonded to trifunctional silicon used for a coating resin in Japanese Patent Application Laid-Open No. 2015-138230 is relatively less worn (hereinafter referred to as an abrasion resistance) even in a case of being subjected to a mechanical load or the like for a long period of time. On the other hand, it can be considered, however, that the silicone-modified resin having a terminal bonded to trifunctional silicon is relatively less effective to reduce the surface free energy, and thus the magnetic carrier described in Japanese Patent Application Laid-Open No. 2015-138230 had an insufficient stain resistance. Therefore, it can be considered that even in a case of using the magnetic carrier described in Japanese Patent Application Laid-Open No. 2015-138230, there is a demand for a further improvement in the stability of image density and developability, and the suppression of fogging and toner scattering.

The present inventors have found as a result of intensive studies that an excellent stain resistance and an excellent abrasion resistance can be provided to the magnetic carrier when a magnetic carrier satisfying a specific parameter is used.

There are many units derived from silicon atoms on the surface of the magnetic carrier according to the present disclosure, and thus the surface free energy of the magnetic carrier surface can be reduced, as a result of this, the magnetic carrier according to the present disclosure has an excellent stain resistance. Furthermore, there are few units derived from silicon atoms inside the resin coating layer, and thus the free energy binding the molecules is high, as a result of this, the magnetic carrier according to the present disclosure has an excellent abrasion resistance.

That is, the magnetic carrier according to the present disclosure is a magnetic carrier including: a magnetic core; and a resin coating layer to coat a surface of the magnetic core, wherein the resin coating layer has a thickness of 50 nm or more, a coating resin to form the resin coating layer contains a resin S having an organosilicon polymer moiety, when a ratio of an amount of silicon element to a sum total of an amount of nitrogen element, an amount of silicon element, an amount of fluorine element, an amount of carbon element, an amount of titanium element, an amount of strontium element, an amount of tin element, an amount of aluminum element, and an amount of oxygen element as determined when the surface of the magnetic carrier is analyzed by X-ray photoelectron spectroscopy is denoted by S0 (atomic percentage), S0 is 1.0 or more and 15.0 or less, and when a ratio of an amount of silicon element to a sum total of an amount of nitrogen element, an amount of silicon element, an amount of fluorine element, an amount of carbon element, an amount of titanium element, an amount of strontium element, an amount of tin element, an amount of aluminum element, and an amount of oxygen element as determined when a position 20 nm deep from the surface of the magnetic carrier is analyzed by X-ray photoelectron spectroscopy is denoted by S20 (atomic percentage), S20 is 0.0 or more and 5.0 or less.

The fact that S0 is 1.0 or more and 15.0 or less means that the atomic abundance ratio of Si in the surface layer of the magnetic carrier is equal to or more than a certain level, and this makes it possible to reduce the surface free energy of the magnetic carrier. As a result of that, a toner component such as wax is less likely to adhere to the surface of the magnetic carrier, and thus the stain resistance is improved. On the other hand, the fact that S20 is 0.0 or more and 5.0 or less means that the atomic abundance ratio of Si at a position at a depth of 20 nm from the surface of the magnetic carrier is equal to or less than a certain value, and this makes it possible to increase an intermolecular force in the resin coating layer included in the magnetic carrier, and thus the abrasion resistance is improved. That is, when S0 and S20 are within the range of the above-described values, a balance between the high abrasion resistance and the high level of stain resistance can be achieved. S0 is preferably 1.5 or more and 15.0 or less. S20 is preferably 0.0 or more and 2.0 or less. This makes it possible to further improve the abrasion resistance and the stain resistance.

The ratio of S20 to S0 is preferably 0.8 or less. This means that the abundance ratio of Si at a position at a depth of 20 nm from the surface of the magnetic carrier is lower than that at the surface of the magnetic carrier. When the ratio of S20 to S0 is 0.8 or less, the contrast in an amount of Si between on the surface of the magnetic carrier and at the position at a depth of 20 nm from the surface of the magnetic carrier can be enhanced, this makes it possible to divide the functionality of the resin coating layer included in the magnetic carrier. As a result of this, the abrasion resistance and the stain resistance can be increased more effectively.

In the magnetic carrier according to the present disclosure, when a ratio of an amount of carbon element to a sum total of an amount of nitrogen element, an amount of silicon element, an amount of fluorine element, an amount of carbon element, an amount of titanium element, an amount of strontium element, an amount of tin element, an amount of aluminum element, and an amount of oxygen element as determined when a surface of the magnetic carrier is analyzed by X-ray photoelectron spectroscopy is denoted by C0 (atomic percentage), a ratio of S0 to C0 is preferably 0.020 or more and 0.20 or less, when a ratio of an amount of carbon element to a sum total of an amount of nitrogen element, an amount of silicon element, an amount of fluorine element, an amount of carbon element, an amount of titanium element, an amount of strontium element, an amount of tin element, an amount of aluminum element, and an amount of oxygen element as determined when a position at a depth of 20 nm from the surface of the magnetic carrier is analyzed by X-ray photoelectron spectroscopy is denoted by C20 (atomic percentage), a ratio of S20 to C20 is preferably 0.0 or more and 0.060 or less.

The fact that C0 and S0 satisfy the above-described relationship and that C20 and S20 satisfy the above-described relationship means that the ratio of silicon atoms to carbon atoms detected by X-ray photoelectron spectroscopy is high at the surface of the magnetic carrier and low at a position at a depth of 20 nm from the surface of the magnetic carrier. For this reason, the functional group derived from the silicon atom contained in the resin coating layer contributes to lowering the surface free energy on the surface of the magnetic carrier, and does not contribute to lowering the interaction between the molecules inside the resin coating layer. As a result of this, the stain resistance and the abrasion resistance can be improved.

When a ratio of an amount of silicon element to a sum total of an amount of nitrogen element, an amount of silicon element, an amount of fluorine element, an amount of carbon element, an amount of titanium element, an amount of strontium element, an amount of tin element, an amount of aluminum element, and an amount of oxygen element as determined when a position at a depth of 10 nm from the surface of the magnetic carrier is analyzed by X-ray photoelectron spectroscopy is denoted by S10 (atomic percentage), S10 is preferably 0.0 or more and 5.0 or less. The fact that S10 is 0.0 or more and 5.0 or less indicates that the percentage of silicon atoms is small at a position at a depth of 10 nm from the surface of the magnetic carrier, and as a result of this, the abrasion resistance can be further improved.

When positions at depths of 30 nm, 40 nm, and 50 nm from the surface of the magnetic carrier are analyzed by X-ray photoelectron spectroscopy, ratios S30, S40, and S50 (atomic percentage) of an amount of silicon element as determined by the analysis at respective positions preferably satisfy the following. That is, S30 is 0.0 or more and 2.0 or less, S40 is 0.0 or more and 2.0 or less, and S50 is 0.0 or more and 2.0 or less. As used herein, the ratio of an amount of silicon element is a ratio of an amount of silicon element to a sum total of an amount of nitrogen element, an amount of silicon element, an amount of fluorine element, an amount of carbon element, an amount of titanium element, an amount of strontium element, an amount of tin element, an amount of aluminum element, and an amount of oxygen element. That is, when the content percentages of silicon atoms at the positions at depths of 30 nm, 40 nm, and 50 nm from the surface of the magnetic carrier are reduced, the abrasion resistance of the magnetic carrier can be improved.

The content percentage of the resin S in the coating resin included in the resin coating layer is preferably 1% by mass or more and 50% by mass or less. When the content percentage of the resin S in the coating resin is 1% by mass or more, an elevated effect of reducing the surface free energy by the resin S can be obtained, and the stain resistance can be improved. When the content percentage of the resin S in the coating resin is 50% by mass or less, the intermolecular interaction inside the resin coating layer is not excessively reduced, and the strength of the coating resin is increased, so that the abrasion resistance can be improved.

The coating resin contains at least a resin A as the resin S, the resin A includes: a unit Y1 represented by the following formula (1); and a unit Y2 represented by the following formula (2), and when a mass of the resin A is denoted by X, a mass of the unit Y1 is denoted by "y1", and a mass of the unit Y2 is denoted by "y2", a ratio of the sum of "y1" and "y2" to X is preferably 0.90 or more and 1.00 or less, and a ratio of "y1" to "y2" is preferably 1.00 or more and 30.0 or less.

The unit Y2 has a silicone structure, and because of this structure, an effect of reducing the surface free energy can be obtained and the stain resistance can be improved.

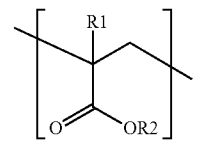

(1)

(In the formula (1), R1 represents H or CH$_3$, R2 represents a hydrocarbon group having 1 to 6 carbon atoms which may have a substituent, and the substituent is a hydroxy group or a carboxy group.)

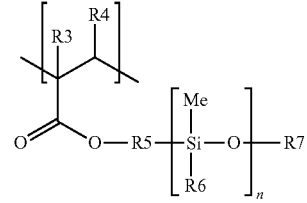

(2)

(In the formula (2), R3 and R4 each independently represent H or $CH_3$, R5 represents a single bond or a hydrocarbon group having 1 or more and 10 or less carbon atoms, R6 represents a hydrocarbon group having 1 or more and 10 or less carbon atoms, R7 represents H, $CH_3$ or $Si(CH_3)_3$, and n represents an integer of 2 or more and 150 or less.)

In the unit Y1, R2 is preferably an alkyl group having 1 to 6 carbon atoms which may have a substituent. As a specific method of introducing the unit Y1 in the resin A, a monomer selected from the monomers below can be introduced by copolymerization when the resin A is synthesized by polymerization. Examples of the monomer include: methyl acrylate, ethyl acrylate, propyl acrylate, butyl acrylate, hexyl acrylate, cyclobutyl acrylate, cyclohexyl acrylate, cyclopentyl acrylate, methyl methacrylate, ethyl methacrylate, propyl methacrylate, butyl methacrylate, hexyl methacrylate, cyclobutyl methacrylate, cyclohexyl methacrylate, cyclopentyl methacrylate, 2-hydroxyethyl acrylate, 2-carboxyethyl acrylate, 2-hydroxyethyl methacrylate, and 2-carboxyethyl methacrylate.

In the unit Y2, R5 is preferably an alkylene having 1 to 6 carbon atoms, and R6 is preferably an alkyl group having 1 to 6 carbon atoms or a phenyl group. The unit Y2 can be introduced in the resin A, for example, by copolymerizing an acrylic acid ester, a methacrylic acid ester, or a 2-butenoic acid ester, which have an esterified silicone structure, at the time of synthesizing the resin A by polymerization.

When the ratio of the sum of "y1" and "y2" to X is 0.90 or more in the resin A, the compatibility between the resin A and a resin other than the resin S included in a coating resin does not become excessively low, whereby the deterioration of the abrasion resistance can be suppressed. In addition, an elevated effect of reducing the surface free energy can be obtained and thus the stain resistance can be improved.

When the ratio of "y1" to "y2" in the resin A is 1.00 or more, the ratio of the unit Y2 is not excessively high, so that a decrease of the intermolecular interaction inside the resin coating layer can be suppressed and the abrasion resistance can be improved. In contrast, when the ratio of "y1" to "y2" is 30.0 or less, an elevated effect of reducing the surface free energy can be obtained, and the stain resistance can be improved.

The content percentage of the resin A in the coating resin is preferably 3% by mass or more and 20% by mass or less. When the content percentage of the resin A in the coating resin is 3% by mass or more, an elevated effect of reducing the surface free energy by the resin A can be obtained, and the stain resistance can be improved. When the content percentage of the resin A in the coating resin is 20% by mass or less, the intermolecular interaction inside the resin coating layer is not excessively reduced, and the strength of the coating resin is increased, so that the abrasion resistance can be improved.

In the resin A, when the sum of the number of units Y1 and the number of units Y2 is denoted by m, m is preferably 50 or more and 250 or less. When m is 50 or more, the molecular weight increases, and thus the abrasion resistance can be improved. In contrast, when m is 250 or less, the interaction between the resin A and a resin other than the resin S included in the coating resin increases, and thus the abrasion resistance can be improved.

In Resin A, n represents the length of a side chain formed with a silicone structure in a silicone graft structure. When n is 2 or more and 150 or less, an elevated effect of reducing the surface free energy of the magnetic carrier can be obtained. When n is 2 or more, an elevated effect of reducing the surface free energy by the resin A can be obtained, and the stain resistance can be improved. When n is 150 or less, the interaction between molecules inside the resin coating layer is not excessively reduced, and the strength of the coating resin is increased, so that the abrasion resistance can be improved. In the resin A, n is more preferably 5 or more and 60 or less.

The resin A may have a functional group such as a nitrogen-containing group, a carboxyl group, or a hydroxyl group. When the resin A has such functional group, an electrostatic charge up of a developer can be suppressed particularly in a low-humidity environment. In particular, when the resin A has a hydroxyl group, an effect of enhancing an interaction between molecules by hydrogen bonding is also obtained, and the abrasion resistance can be improved.

When the resin A has a carboxyl group, a preferable range of the acid value of the resin A is from 5 mg KOH/mg to 100 mg KOH/mg. When the acid value of the resin A is 5 mg KOH/mg or more, the charge up is increased, and when the acid value of the resin A is 100 mg KOH/mg or less, the charge retention of the developer is improved.

When the resin A has a hydroxyl group, a preferable range of the hydroxyl value of the resin A is from 5 mg KOH/mg to 50 mg KOH/mg. When the hydroxyl value of the resin A is 5 mg KOH/mg or more, the charge up is increased, and when the hydroxyl value of the resin A is 50 mg KOH/mg or less, the charge retention of the developer is improved.

When the coating resin contains the resin A, the coating resin further contains the resin B, the content percentage of the resin B in the coating resin is 50% by mass or more and 99% by mass or less, and when the solubility parameter (SP value) of the unit Y1 is denoted by SPa and the SP value of the resin B is denoted by SPb, the absolute value of the difference between SPa and SPb is preferably 0.0 or more and 2.0 or less. When the resin B has the unit Y2, the content percentage of the unit Y2 in the resin B is preferably 0.1% by mass or less.

The SP value is calculated by the following equation.

$$SP\ value = \sqrt{(Ev/v)} = \sqrt{(\Sigma \Delta ei / \Sigma \Delta vi)}$$

Ev: evaporation energy (J/mol),
v: molar volume ($cm^3$/mol),
$\Delta ei$: evaporation energy of each atom or each atomic group,
$\Delta vi$: molar volume of each atom or each atomic group When the absolute value of the difference between SPa and SPb is 0.0 or more and 2.0 or less, the compatibility between the resin A and the resin B increases, and the abrasion resistance can be improved. The smaller the absolute value of the difference between SPa and SPb is, the higher the compatibility is, and the absolute value is more preferably 1.0 or less.

As the resin B, it is preferable to use a resin which satisfies that the absolute value of the difference between SPa and SPb is 0.0 or more and 2.0 or less, but the structure of the resin B is not particularly limited, and for example, there can be used the following resin: acrylic resin, urethane resin, polyethylene, polyethylene terephthalate, polystyrene, or phenol resin. From the viewpoint of having an SP value that is close to the SP value of the unit Y1 and enabling to enhance the compatibility with the resin A, the resin B is preferably an acrylic resin.

When the resin S has the resin A, the resin B preferably has the unit Y1. This makes it possible to decrease the difference in SP values between the resin A and the resin B, so that the compatibility between the resin A and the resin B can be enhanced. When the resin S has the resin A, the resin B more preferably contains the unit Y1 in a percentage of 75% by mass or more.

The resin B preferably has a unit Y3 represented by the following formula (7).

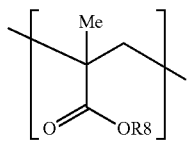
(7)

(In the formula (7), R8 represents a cyclohexyl group, a cycloheptyl group, a cyclooctyl group, a cyclopentyl group, a cyclobutyl group, or a cyclopropyl group.)

The unit Y3 has an alicyclic hydrocarbon group represented by R8 in the formula (7), and when the resin B has this alicyclic hydrocarbon group, the surface of the resin coating layer is smooth. As a result of this, the toner or a toner component such as an external additive for imparting fluidity to the toner particle is inhibited from adhering to the magnetic carrier, and the stain resistance can be improved. The unit Y3 included in the resin B may be only one type of structure or two or more types of structures.

In the synthesis of the resin B, when the total amount of monomers used for the synthesis of the resin B is defined as 100 parts by mass, a methacrylic acid ester monomer having an alicyclic hydrocarbon group is preferably used at a ratio in a range from 50 parts by mass to 90 parts by mass.

From the viewpoint of the stability of coating, the resin B preferably has a weight average molecular weight (Mw) of 20,000 or more and 120,000 or less, and more preferably 30,000 or more and 100,000 or less.

The acid value of the resin B is preferably 0 mg KOH/g or more and 3.0 mg KOH/g or less, more preferably 0 mg KOH/g or more and 2.8 mg KOH/g or less, and still more preferably 0 mg KOH/g or more and 2.5 mg KOH/g or less. When the acid value of the resin B is 3.0 mg KOH/g or less, self-aggregation of the resin due to the influence of the acid value is less likely to occur, and the smoothness of the surface of the resin coating layer is less likely to be deteriorated.

The acid value of the resin B can be controlled by using a monomer having a polar group such as a carboxy group or a sulfo group (sulfonic acid group) in the synthesis of the resin B and adjusting the added amount of the monomer. However, the resin B having a low acid value is preferable, and thus it is preferable not to use a monomer having a polar group in the synthesis of the resin B.

Even in a case where a monomer only to form an ester bond is used in the synthesis of a resin, the synthesized resin may have a slight acid value. This is considered to be due to a carboxyl group produced when a part of the ester bond is decomposed during the synthesis of the resin (during the polymerization).

The resin B is preferably a polymer (copolymer) obtained by copolymerizing a macromonomer and a methacrylic acid ester monomer having an alicyclic hydrocarbon group. Here, the macromonomer refers to a macromonomer obtained by polymerizing at least one monomer selected from methyl acrylate, methyl methacrylate, butyl acrylate, butyl methacrylate, 2-ethylhexyl acrylate, 2-ethylhexyl methacrylate, styrene, acrylonitrile, or methacrylonitrile.

By using the macromonomer in the synthesis of the resin B, the adhesion between the resin coating layer and the magnetic core is improved, and the toner charging ability of the magnetic carrier can be improved.

The weight average molecular weight (Mw) of the macromonomer used in the synthesis of the resin B is preferably 2000 or more and 10,000 or less, and more preferably 3000 or more and 8000 or less.

In the synthesis of the resin B, when the total amount of monomers used in the synthesis of the resin B is defined as 100 parts by mass, the macromonomer is preferably used in a range from 5.0 parts by mass to 40.0 parts by mass.

When a methacrylic acid ester monomer is used in the synthesis of the resin B, the molecular entanglement is enhanced, and the adhesion of the coating resin to the magnetic core is improved. As a result of this, the coating is less likely to be peeled off even when subjected to a load applied by a stirring member or the like of the developing unit, and a stable charging ability can be maintained for a long period of time, thereby enabling to contribute to a high-quality image output.

It is preferable that the coating resin contains at least a resin C as the resin S, the resin C is a silicone-modified block polymer having at least one moiety selected from the group consisting of moieties represented by the following formulae (3) to (6), and the total content percentage of the moieties represented by the following formulae (3) to (6) in the resin C is 10% by mass or more and 40% by mass or less.

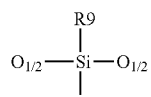
(3)

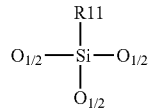
(4)

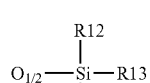
(5)

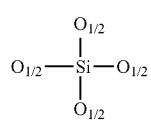
(6)

(In the formulae (3) to (6), R9 to R14 each represent a hydrogen atom, an alkyl group having 1 or more and 4 or less carbon atoms, an alkoxy group having 1 or more and 4 or less carbon atoms, a phenyl group, a phenoxy group, an alkenyl group having 2 or more and 4 or less carbon atoms, or an alkenyloxy group having 2 or more and 4 or less carbon atoms, and —$O_{1/2}$ represents a sharing of O between adjacent Si atoms.)

Since the resin C is a silicone-modified block polymer, the resin C contributes to lowering the surface free energy of the magnetic carrier, and the stain resistance of the magnetic carrier can be improved. In the coating resin, the resin C may be used in combination with the above-described resin A and/or resin B.

In the present disclosure, the resin coating layer preferably contains an electro-conductive fine particle. The electro-conductive fine particle can appropriately control the specific resistance of the magnetic carrier. As a result of that, there can be released a countercharge after the toner having been subjected to the developing, thereby suppressing voids.

The ratio of the electro-conductive fine particle contained in the resin coating layer is preferably 0.1 parts by mass or more and 20 parts by mass or less with respect to 100 parts by mass of the coating resin. When the content percentage of the electro-conductive fine particle in the resin coating layer is 0.1 parts by mass or more with respect to 100 parts by mass of the coating resin, an effect of adding the electro-conductive fine particle can be obtained, and when the content percentage is 20 parts by mass or less, it is possible to suppress the deterioration of hue due to the detachment of an electro-conductive fine particle. Examples of the electro-conductive fine particle include carbon black, titanium oxide, and silver.

A fine particle other than the electro-conductive fine particle may be contained in the resin coating layer for the purpose of an enhancement of the toner charging ability and an improvement in releasability. The fine particle contained in the resin coating layer may be any fine particle of an organic material or of an inorganic material, but is preferably a crosslinked resin fine particle or an inorganic fine particle, which has a strength capable of retaining the shape of the fine particle at the time of coating. Examples of a crosslinked resin that forms the crosslinked resin fine particle include a crosslinked polymethyl methacrylate resin, a crosslinked polystyrene resin, a melamine resin, a guanamine resin, a urea resin, a phenol resin, and a nylon resin. Examples of the inorganic fine particle include silica, alumina, and titania. The content percentage of the fine particle in the resin coating layer is preferably 0.1 parts by mass or more and 20 parts by mass or less with respect to 100 parts by mass of the coating resin.

<XPS Measurement Method of Si Atomic Concentration>

A magnetic carrier is adhered to an indium foil. At that time, the particles of the magnetic carrier are evenly applied so that the indium foil portion is not exposed.

The measurement conditions are as follows.
Apparatus: PHI 5000 VersaProbe II (manufactured by ULVAC-PHI, Inc.)
Irradiated radiation: Al Kα X-rays
Output: 25 W, 15 kV
Photoelectron take-off angle: 45°
PassEnergy: 58.7 eV
Stepsize:0.125 eV
XPS peaks: C1s, O1s, Si2p, Ti2p, Sr3d
GUN Type: GCIB
Time:75 min
Interval:15 min
SputterSetting: 5 kV
As shown in the conditions, the elemental analysis in the depth profile every about 10 nm can be performed by the setting of Interval to 15 min.

<Method of Manufacturing a Magnetic Core>

As the magnetic core, there can be used a known magnetic particle such as a magnetite particle, a ferrite particle, or a magnetic body-dispersed resin particle. Among them, a magnetic particle that can be obtained from a porous magnetic particle whose pores are filled with a resin, or a magnetic body-dispersed resin particle, that is, a magnetic particle containing a magnetic oxide and a resin composition is preferable from the viewpoint of the long service life, since the specific gravity of the magnetic carrier can be reduced. When the specific gravity of the magnetic carrier is decreased, there can be reduced a mechanical load applied to the toner existing as a component of the developer in the developing unit, for example, and the toner component can be prevented from adhering to the surface of the magnetic carrier. Furthermore, the mechanical load between the magnetic carriers can also be reduced, whereby the peeling, the chipping, and the scraping of the resin coating layer can be suppressed. These tendencies can improve dot reproduction, and a high-definition image can be obtained.

Examples of the resin to be contained in the pores of the porous magnetic particle include a copolymer resin used for a coating resin, but not limited thereto, and a known thermoplastic resin or a thermosetting resin can be used. The thermoplastic resin is preferably the same resin as the copolymer used for a coating resin, but is not limited thereto, and examples thereof include the following resins: polystyrene, polymethyl methacrylate; a styrene-acrylic acid ester copolymer; a styrene-methacrylic acid ester copolymer; a styrene-butadiene copolymer; an ethylene-vinyl acetate copolymer; polyvinyl chloride; polyvinyl acetate; a polyvinylidene fluoride resin; a fluorocarbon resin; a perfluorocarbon resin; a solvent-soluble perfluorocarbon resin; polyvinyl pyrrolidone; a petroleum resin; a novolak resin; a saturated alkyl polyester resin; an aromatic polyester resin such as polyethylene terephthalate, polybutylene terephthalate, or polyarylate; a polyamide resin; a polyacetal resin; a polycarbonate resin; a polyether sulfone resin; a polysulfone resin; a polyphenylene sulfide resin; and a polyether ketone resin. Examples of the thermosetting resin include the following: a phenol resin; a modified phenol resin; a maleic resin; an alkyd resin; an epoxy resin; an acrylic resin; an unsaturated polyester obtained by polycondensation of maleic anhydride, terephthalic acid, and polyhydric alcohol; a urea resin; a melamine resin; a urea-melamine resin; a xylene resin; a toluene resin; a guanamine resin; a melamine-guanamine resin; an acetoguanamine resin; a glyptal resin; a furan resin; a silicone resin; a polyimide; a polyamideimide resin; a polyetherimide resin; and a polyurethane resin.

Examples of the method of filling a resin component into voids of a porous magnetic particle include a method in which the resin component is diluted with a solvent, and the diluted solution of the resin component is filled into the inside of the porous magnetic particle, thereafter the solvent is volatilized. The solvent used here may be any solvent that can dissolve each of the resin components. In a case where the resin is soluble in an organic solvent, there should be used an organic solvent such as toluene, xylene, butyl cellosolve acetate, methyl ethyl ketone, methyl isobutyl ketone, or methanol. In a case where the resin is a water-soluble resin component or an emulsion type resin component, water should be used for a solvent.

Examples of the method of adding a resin component diluted with a solvent into the inside of the porous magnetic core particle include a method in which the resin component is impregnated by a coating method such as a dipping process, a spraying process, a brush coating process, a fluidized bed, or a kneading process. In a case of filling a thermosetting resin, the solvent is volatilized, and then a curing reaction is caused by heating to a temperature at which the used resin is cured.

On the other hand, examples of specific methods of producing the magnetic body-dispersed resin particle include the following methods. For example, a submicron magnetic body such as iron powder, a magnetite particle, or a ferrite particle is kneaded so as to be dispersed in a thermoplastic resin, and then pulverized to a desired particle size of the magnetic carrier. Furthermore, the magnetic carrier is subjected to a thermal or a mechanical spheroidizing treatment if necessary, whereby the magnetic body-dispersed resin particle can be obtained. The magnetic body-dispersed resin particle can also be produced by dispersing the magnetic body in a monomer, followed by polymerizing the monomer to form a resin. Examples of the resin used for producing the magnetic body-dispersed resin particle include resins such as a vinyl resin, a polyester resin, an epoxy resin, a phenol resin, a urea resin, a polyurethane resin, a polyimide resin, a cellulose resin, a silicone resin, an acrylic resin, and a polyether resin. These resins may be used singly or in combination of two or more kinds thereof. Among these resins, a phenol resin is in particular preferably used from the viewpoint of enhancing the strength of the magnetic core. The true density and the specific resistance of the magnetic body-dispersed resin particle can be adjusted by altering the amount of the magnetic material. Specifically, the magnetic body is preferably added to the resin in an amount of 70% by mass or more and 95% by mass or less with respect to the magnetic carrier.

The magnetic core preferably has a volume-based 50% diameter (D50) of 20 μm or more and 80 μm or less. This makes it possible to uniformly coat the magnetic core with the coating resin, thereby preventing the magnetic carrier from adhering to a member or the like, and appropriately adjusting the developer density in the magnetic brush, and thus a high quality image can be obtained.

The magnetic core preferably has a specific electrical resistance value of $1.0 \times 10^5$ Ω·cm or more and $1.0 \times 10^{14}$ Ω·cm or less at an intensity of the electric field of 1000 V/cm, since by which an excellent developability can be obtained.

The method of coating treatment of the magnetic core surface with the coating resin is not particularly limited, and any known method can be used. For example, at the time of adding the solid content of the resin component when the coating resin is introduced, there can be included a step of an adding way to add each ⅓ portion of the resin solution separately in three times. At this time, a percentage of Si element in the coating resin can be changed by altering the resin ratio in the resin solution, if necessary. In particular, when the resin A and the resin B are used in combination for the coating resin, Si moieties are spontaneously oriented so as to incline toward the surface layer without requiring any special contrivance in the coating treatment.

Specific examples of the coating method include a dipping process in which the solvent is volatilized while the magnetic core and the coating resin solution are stirred, thereby coating the surface of the magnetic core with the coating resin. Specific examples of the method include a process using a universal mixing stirrer (manufactured by Fuji Paudal Co., Ltd.), Nauta mixer (manufactured by Hosokawa Micron Corporation), or the like. Alternatively, there is exemplified a process in which a coating resin solution is sprayed from a spray nozzle to the magnetic cores while forming a fluidized layer, thereby coating the surface of the magnetic core with the coating resin. Specific examples thereof include a process of using SPIRA COTA (manufactured by Okada Seiko Co., Ltd.) or SPIR-A-FLOW (manufactured by Freund Corporation). Alternatively, there is exemplified a dry coating process in which a particulate coating resin is coated on the magnetic core. Specifically, there can be exemplified a treatment process of using an apparatus such as Nara Hybridization System (manufactured by NARA MACHINERY CO., LTD.), MECHANO FUSION (manufactured by Hosokawa Micron Corporation), HIGH FLEX GRAL (manufactured by Fukae Powtec Co., Ltd.), or Theta Composer (manufactured by TOKUJU CORPORATION).

Next, there will be described a magnetic carrier, which includes a magnetic core and a resin coating layer. The magnetic carrier preferably has a saturation magnetization intensity of 40 Am$^2$/kg or more and 70 Am$^2$/kg or less under a magnetic field of 5000/4πkA/m. When the saturation magnetization intensity of the magnetic carrier is within the above range, the magnetic carrier is magnetically bound to a developing sleeve with an appropriate force, and thus the adhesion of the magnetic carrier to the member or the like can be more effectively suppressed. In addition, the stress applied to the toner in the magnetic brush can be reduced, so that the deterioration of the toner and an adhesion of the toner to other members can be effectively suppressed.

The saturation magnetization intensity of the magnetic carrier can be appropriately adjusted by altering the amount of the contained resin. The residual magnetization of the magnetic carrier is preferably 20.0 Am$^2$/kg or less, and more preferably 10.0 Am$^2$/kg or less. When the residual magnetization of the magnetic carrier is within the above range, there is obtained a developer with a particularly high fluidity, and thus a high dot reproduction is obtained. The magnetic carrier preferably has a true density of 2.5 g/cm$^3$ or more and 5.5 g/cm$^3$ or less, and more preferably 3.0 g/cm$^3$ or more and 5.0 g/cm$^3$ or less. When a two-component developer contains a magnetic carrier having a true density within the above range, a load applied to the toner is small, and an adhesion of the toner component to the magnetic carrier is suppressed. In addition, when the magnetic carrier has a true density within the above range, there can be achieved a balance between a stable developability at low electric field intensity and the prevention of the adhesion of the magnetic carrier to the member and the like.

The magnetic carrier preferably has a volume-based 50% diameter (D50) of 21 μm or more and 81 μm or less from the viewpoint of a toner charging ability, a suppression of an adhesion of the magnetic carrier to an image area, and an improvement of an image quality. More preferably, the volume-based 50% diameter (D50) of the magnetic carrier is 25 μm or more and 60 μm or less.

Next, there will be described in detail below a preferable configuration of a toner to be used in combination with the magnetic carrier according to the present disclosure to obtain a developer.

<Binder Resin>

The following polymers and the like can be used for a binder resin in a toner particle included in the toner. Examples of the polymer and the like include: monomers of styrene and its substitutes such as polystyrene, poly-p-chlorostyrene, and polyvinyl toluene; styrene-based copolymer such as styrene-p-chlorostyrene copolymer, styrene-vinyltoluene copolymer, styrene-vinylnaphthalene copolymer, styrene-acrylic acid ester copolymer, and styrene-methacrylic acid ester copolymer; styrene-based copolymer resin, polyester resin, hybrid resin in which polyester resin and vinyl-based resin are mixed or both are partially reacted; polyvinyl chloride, a phenol resin, a natural modified phenol resin, a natural resin-modified maleic acid resin, an acrylic resin, a methacrylic resin, polyvinyl acetate, a silicone resin, a polyester resin, polyurethane, a polyamide resin, a furan resin, an epoxy resin, a xylene resin, a polyethylene resin, and a polypropylene resin. Among them, a polyester resin is preferably used for a main component of the binder resin from the viewpoint of the low temperature fixability.

Examples of monomers used for a polyester unit of a polyester resin include a polyhydric alcohol (dihydric alcohol or an alcohol having three or more hydroxy groups), a polycarboxylic acid (dicarboxylic acid or a carboxylic acid having three or more carboxyl groups), an acid anhydride thereof, and a lower alkyl ester thereof. Here, an intramolecular partial crosslinking in an amorphous resin is effective to form a branched polymer for exhibiting "strain-hardening behavior" and, for this purpose, a polyfunctional compound having three or more functional groups is preferably used. Therefore, a raw material monomer of the polyester unit preferably contains a carboxylic acid having three or more carboxyl groups, an acid anhydride thereof or a lower alkyl ester thereof, and/or an alcohol having three or more hydroxy groups.

The following polyhydric alcohol monomers can be used for a polyhydric alcohol monomer used for the polyester unit of the polyester resin.

Examples of the dihydric alcohol component include ethylene glycol, propylene glycol, 1,3-butanediol, 1,4-butanediol, 2,3-butanediol, diethylene glycol, triethylene glycol, 1,5-pentanediol, 1,6-hexanediol, neopentyl glycol, 2-ethyl-1,3-hexanediol, hydrogenated bisphenol A, and bisphenols represented by the formula (A) and derivatives thereof;

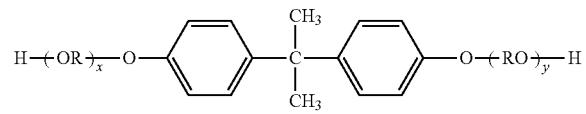

(A)

(In the formula (A), R represents an ethylene group or a propylene group, x and y each represent an integer of 0 or more, and an average value of x+y is 0 or more and 10 or less.)

diols represented by the formula (B);

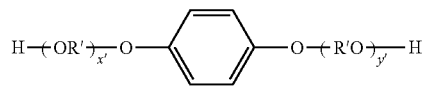

(B)

(In the formula (B), R' is —CH$_2$CH$_2$—, —CH$_2$—CH(CH$_3$)—, or —CH$_2$—C(CH$_3$)$_2$—, x' and y' are each an integer of 0 or more, and an average value of x'+y' is 0 or more and 10 or less.)

Examples of an alcohol component having three or more hydroxy groups include sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerol, 2-methylpropanetriol, 2-methyl-1,2,4-butanetriol, trimethylolethane, trimethylolpropane, and 1,3,5-trihydroxymethylbenzene. Among them, glycerol, trimethylolpropane, and pentaerythritol are preferably used.

These dihydric alcohols and alcohols having three or more hydroxy groups can be used alone or in combination of two or more thereof.

The following polycarboxylic acid monomers can be used for a polycarboxylic acid monomer used for the polyester unit of the polyester resin.

Examples of the dicarboxylic acid component include maleic acid, fumaric acid, citraconic acid, itaconic acid, glutaconic acid, phthalic acid, isophthalic acid, terephthalic acid, succinic acid, adipic acid, sebacic acid, azelaic acid, malonic acid, n-dodecenyl succinic acid, isododecenyl succinic acid, n-dodecyl succinic acid, isododecyl succinic acid, n-octenyl succinic acid, n-octyl succinic acid, isooctenyl succinic acid, isooctyl succinic acid, anhydrides of these acids, and lower alkyl esters of these acids. Among these, maleic acid, fumaric acid, terephthalic acid, and n-dodecenyl succinic acid are preferably used.

Examples of carboxylic acids having three or more carboxyl groups, an acid anhydride thereof, or a lower alkyl ester thereof include: 1,2,4-benzenetricarboxylic acid, 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylenecarboxypropane, 1,2,4-cyclohexanetricarboxylic acid, tetra(methylenecarboxyl)methane, 1,2,7,8-octanetetracarboxylic acid, pyromellitic acid, Empol trimer acid, acid anhydrides thereof, and lower alkyl esters thereof. Among these, 1,2,4-benzenetricarboxylic acid, i.e., trimellitic acid or a derivative thereof is preferably used in particular since they are inexpensive and a reaction control thereof is easy.

These dicarboxylic acids and the like and carboxylic acids having three or more carboxyl groups can be used alone or in combination of two or more thereof.

The method of producing the polyester unit is not particularly limited, and a known method can be used. For example, the alcohol monomer and the carboxylic acid monomer described above are simultaneously added, and polymerized through an esterification reaction, or a transesterification reaction, and a condensation reaction to produce a polyester resin. The polymerization temperature is not particularly limited, but is preferably in the range from 180° C. to 290° C. In the polymerization of the polyester unit, there can be used, for example, a titanium-based catalyst, a tin-based catalyst, a polymerization catalyst such as zinc acetate, antimony trioxide, or germanium dioxide. In particular, a polyester unit polymerized using a tin-based catalyst is more preferable for the binder resin.

The polyester resin preferably has an acid value of 5 mg KOH/g or more and 20 mg KOH/g or less, and preferably has a hydroxyl value of 20 mg KOH/g or more and 70 mg KOH/g or less. This makes it possible to suppress an adsorbed moisture amount in a high-temperature and high-humidity environment, thereby enabling to keep a non-electrostatic adhesion force to a low level, and thus a fogging can be suppressed A mixture of a low molecular weight resin and a high molecular weight resin may be used for the binder resin. The content ratio of a high molecular weight resin and a low molecular weight resin on a mass basis is preferably from 40/60 to 85/15 (a high molecular weight resin/a low molecular weight resin) from the viewpoint of low temperature fixability and hot offset resistance.

<Releasing Agent>

Examples of waxes used for the toner include the following: hydrocarbon-based waxes such as low molecular weight polyethylene, low molecular weight polypropylene, alkylene copolymer, microcrystalline waxes, paraffin waxes, and Fischer-Tropsch waxes; oxide of hydrocarbon-based waxes such as oxidized polyethylene waxes or block copolymer thereof; waxes containing a fatty acid ester as a main component, such as carnauba waxes; a product obtained by partially or entirely deoxidizing fatty acid esters such as deoxidized carnauba waxes. Furthermore, examples thereof include the following: saturated linear fatty acids such as palmitic acid, stearic acid, and montanic acid; unsaturated fatty acids such as brassidic acid, eleostearic acid, and parinaric acid; saturated alcohols such as stearyl alcohol, aralkyl alcohol, behenyl alcohol, carnaubyl alcohol, ceryl alcohol and melissyl alcohol; polyhydric alcohols such as sorbitol; esters of fatty acids such as palmitic acid, stearic acid, behenic acid, and montanic acid and alcohols such as stearyl alcohol, aralkyl alcohol, behenyl alcohol, carnaubyl alcohol, ceryl alcohol, and melissyl alcohol; fatty acid amides such as linoleic acid amide, oleic acid amide, and lauric acid amide; saturated fatty acid bisamides such as methylene bis-stearic acid amide, ethylene bis-capric acid amide, ethylene bis-lauric acid amide, and hexamethylene bis-stearic acid amide; unsaturated fatty acid amides such as ethylene bis-oleic acid amide, hexamethylene bis-oleic acid amide, N,N'-dioleyl adipic acid amide, and N,N'-dioleyl sebacic acid amide; aromatic bisamides such as m-xylene bisstearic acid amide and N,N'-distearyl isophthalic acid amide; aliphatic metal salts such as calcium stearate, calcium laurate, zinc stearate, and magnesium stearate (generally referred to as metal soaps); waxes grafted to an aliphatic hydrocarbon-based wax using a vinyl-based monomer such as styrene or acrylic acid; partial esterified product of fatty acid and polyhydric alcohol such as behenic acid monoglyceride; a methyl ester compound having a hydroxyl group obtained by hydrogenation of a vegetable fat or oil. Among these waxes, hydrocarbon-based waxes such as paraffin waxes and Fischer-Tropsch waxes, or fatty acid ester-based waxes such as carnauba waxes are preferable from the viewpoint of improving a low temperature fixability and a fixing separability. In the present disclosure, a hydrocarbon-based wax is more preferable from the viewpoint of further improving the hot offset resistance.

The wax is preferably used at a ratio of 3 parts by mass or more and 8 parts by mass or less per 100 parts by mass of the binder resin. In an endothermic curve in raising the temperature as measured by a differential scanning calorimetry (DSC) apparatus, the maximum exothermic peak temperature of the wax is preferably 45° C. or more and 140° C. or less. It is preferable that the maximum exothermic peak temperature is within the above range, since a balance between the toner storage stability and the hot offset resistance can be achieved.

<Colorant>

The toner particle preferably contains a colorant. Specific examples of colorants include the following.

Examples of black colorants include: carbon black; a mixture in which a yellow colorant, a magenta colorant, and a cyan colorant are used for toning of black color. A single pigment may be used for the colorant, but an improvement in the definition of an image by use of a combination of dye and pigment is more preferably from the viewpoint of an image quality of a full color image.

Examples of pigments for a magenta toner include the following pigments: C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48:2, 48:3, 48:4, 49, 50, 51, 52, 53, 54, 55, 57:1, 58, 60, 63, 64, 68, 81:1, 83, 87, 88, 89, 90, 112, 114, 122, 123, 146, 147, 150, 163, 184, 202, 206, 207, 209, 238, 269, 282; C.I. Pigment Violet 19; C.I. Vat Red 1, 2, 10, 13, 15, 23, 29, 35. Examples of dyes for a magenta toner include the following dyes: C.I. Solvent Red 1, 3, 8, 23, 24, 25, 27, 30, 49, 81, 82, 83, 84, 100, 109, 121; C.I. Disperse Red 9; C.I. Solvent Violet 8, 13, 14, 21, 27; an oil-soluble dye such as C.I. Disperse Violet 1, C.I. Basic Red 1, 2, 9, 12, 13, 14, 15, 17, 18, 22, 23, 24, 27, 29, 32, 34, 35, 36, 37, 38, 39, 40; a basic dye such as C.I. Basic Violet 1, 3, 7, 10, 14, 15, 21, 25, 26, 27, and 28.

Examples of pigments for a cyan toner include the following pigments: C.I. Pigment Blue 2, 3, 15:2, 15:3, 15:4, 16, 17; C.I. Vat Blue 6; C.I. Acid Blue 45, a copper phthalocyanine pigment having a phthalocyanine skeleton substituted with 1 to 5 phthalimidomethyl groups.

Examples of dyes for a cyan toner include C.I. Solvent Blue 70.

Examples of pigments for a yellow toner include the following pigments: C.I. Pigment Yellow 1, 2, 3, 4, 5, 6, 7, 10, 11, 12, 13, 14, 15, 16, 17, 23, 62, 65, 73, 74, 83, 93, 94, 95, 97, 109, 110, 111, 120, 127, 128, 129, 147, 151, 154, 155, 168, 174, 175, 176, 180, 181, 185; C.I. Vat Yellow 1, 3, 20.

Examples of dyes for a yellow toner include C.I. Solvent Yellow 162.

These colorants can be used alone or in combination, and furthermore can be used in a solid solution state. The colorant is selected in terms of hue angle, chroma, brightness, light resistance, OHP transparency, and dispersibility in the toner. The content percentage of the colorant is preferably 0.1 parts by mass or more and 30.0 parts by mass or less with respect to the total amount of the resin components.

<Inorganic Fine Particle>

The toner preferably contains an inorganic fine particle as an external additive for the main purpose of enhancing fluidity and chargeability, and the inorganic fine particle is preferably in a form of being adhered to the surface of the toner. When an inorganic fine particle is used as a spacer particle to enhance the releasability between the toner and the magnetic carrier, it is preferable to use a silica particle having a number-distribution based maximum peak particle diameter of 80 nm or more and 200 nm or less. In order to more effectively suppress a detachment of an inorganic fine particle from the toner while the inorganic fine particle is served as a spacer particle, the inorganic fine particle more preferably has a number-distribution based maximum peak particle diameter of 100 nm or more and 150 nm or less. In addition, it is preferable to contain an inorganic fine particle having a number-distribution based maximum peak particle diameter of 20 nm or more and 50 nm or less in order to improve the fluidity of the toner, and it is also a preferable embodiment to use the inorganic fine particle in combination with the silica particle described above.

Furthermore, another external additive may be added to the toner particle in order to improve its fluidity and its transferability. An external additive to be externally added to the surface of the toner particle preferably contains an inorganic fine particle such as titanium oxide, alumina oxide, or silica, and plural kinds thereof may be used in combination. The total content percentage of the external additive is preferably 0.3 parts by mass or more and 5.0 parts by mass or less, and more preferably 0.8 parts by mass or more and 4.0 parts by mass or less with respect to 100 parts by mass of the toner particle. Among them, the silica particle having a number-distribution based maximum peak particle diameter of 80 nm or more and 200 nm or less is preferably contained in a ratio of 0.1 parts by mass or more and 2.5 parts by mass or less, and more preferably 0.5 parts by mass or more and 2.0 parts by mass or less. When the silica particle having a number-distribution based maximum peak particle diameter of 80 nm or more and 200 nm or less is contained in a ratio within this range, a more remarkable effect of the silica particle as a spacer particle can be obtained.

In addition, a hydrophobizing treatment is preferably applied to the surfaces of the silica particle or the inorganic fine particle to be used as an external additive. The hydrophobizing treatment is preferably performed with a coupling agent such as a wide variety of titanium coupling agents or a silane coupling agent; a fatty acid or a metal salt thereof; silicone oil; or a combination thereof.

Examples of titanium coupling agents include the following: tetrabutyl titanate, tetraoctyl titanate, isopropyl triisostearoyl titanate, isopropyl tridecylbenzenesulfonyl titanate, and bis(dioctyl pyrophosphate)oxyacetate titanate.

Examples of silane coupling agents include the following: γ-(2-aminoethyl)aminopropyltrimethoxysilane, γ-(2-aminoethyl)aminopropylmethyldimethoxysilane, γ-methacryloxypropyltrimethoxysilane, N-β-(N-vinylbenzylaminoethyl)γ-aminopropyltrimethoxysilane hydrochloride, hexamethyldisilazane, methyltrimethoxysilane, butyltrimethoxysilane, isobutyltrimethoxysilane, hexyltrimethoxysilane, octyltrimethoxysilane, decyltrimethoxysilane, dodecyltrimethoxysilane, phenyltrimethoxysilane, o-methylphenyltrimethoxysilane, and p-methylphenyltrimethoxysilane.

Examples of fatty acids include the following: long-chain fatty acids such as undecylic acid, lauric acid, tridecylic acid, dodecylic acid, myristic acid, palmitic acid, pentadecylic acid, stearic acid, heptadecylic acid, arachic acid, montanic acid, oleic acid, linoleic acid, and arachidonic acid. Examples of a metal of the fatty acid metal salt include zinc, iron, magnesium, aluminum, calcium, sodium, and lithium.

Examples of a silicone oil include dimethyl silicone oil, methyl phenyl silicone oil, and amino-modified silicone oil.

The hydrophobizing treatment is preferably performed in such a way that 1% by mass or more and 30% by mass or less, more preferably 3% by mass or more and 7% by mass or less of a hydrophobizing treatment agent with respect to the particle to be treated is added to the particle to be treated to coat the particle to be treated. The degree of hydrophobization of the hydrophobizing-treated external additive is not particularly limited, but for example, the degree of hydrophobization after the treatment is preferably 40 or more and 98 or less. The degree of hydrophobization is an indication of the wettability of a sample to methanol, and is an index of the hydrophobicity.

When the toner is used in a two-component developer after being combined with the magnetic carrier, the content percentage of the toner in the two-component developer is preferably 2% by mass or more and 15% by mass or less, and more preferably 4% by mass or more and 13% by mass or less. When the content percentage of the toner in the two-component developer is 2% by mass or more, an image density is less likely to be decreased, and when the content percentage is 15% by mass or less, the fogging and the toner scattering can be suppressed.

In a replenishment developer to be supplied to the developing unit according to the decrease of the toner density in the two-component developer contained in the developing unit, it is preferable to use a toner having an amount of the toner in a ratio of 2 parts by mass or more and 50 parts by mass or less with respect to 1 part by mass of an amount of replenishment magnetic carrier.

Next, there will be described by way of example an image forming apparatus equipped with a developing unit which uses: a magnetic carrier according to the present disclosure; a two-component developer; and a replenishment developer, but the present disclosure is not limited thereto.

<Method of Producing a Toner>

The method of producing a toner particle included in the toner is not particularly limited, but a pulverization method is preferable from the viewpoint of the dispersion of a releasing agent or a polymer in which a styrene acrylic polymer is graft-polymerized onto polyolefin. When the toner particle is produced in an aqueous medium, a highly hydrophobic releasing agent or a polymer in which a styrene acrylic polymer is graft-polymerized onto polyolefin tends to be localized inside the toner particle. Therefore, a formation of a core-shell structure by a heat treatment apparatus becomes difficult.

Hereinafter, the procedure of producing a toner by the pulverization method will be described. In a raw material mixing step, specific amounts of a material included in the toner particle, for example, a binder resin, a releasing agent, a colorant, a crystalline polyester, and other components such as a charge control agent, if necessary, are weighed, blended, and mixed. Examples of a mixing apparatus include a double cone mixer, a V-type mixer, a drum-type mixer, a super mixer, Henschel mixer, Nauta mixer, and Mechano Hybrid (manufactured by NIPPON COKE & ENGINEERING CO., LTD.).

Next, the mixed materials are melt-kneaded to disperse wax and the like in the binder resin. In the melt-kneading step, there can be used a batch kneader such as a pressure kneader or Banbury mixer or a continuous kneader, and a uniaxial or a biaxial extruder is preferably used from the viewpoint of superiority of continuous production. Examples of a uniaxial or a biaxial extruder include KTK type twin screw extruder (manufactured by Kobe Steel, Ltd.), TEM type twin screw extruder (manufactured by Toshiba Machine Co., Ltd.), PCM series twin screw extruder (manufactured by Ikegai Iron Works Co., Ltd.), a twin screw extruder (manufactured by K.C.K Engineering Co., Ltd.), Co-Kneader (manufactured by Buss AG), and KNEADEX (manufactured by NIPPON COKE & ENGINEERING CO., LTD.). Furthermore, the resin composition obtained by melt-kneading is rolled with a two-roll or the like and may be cooled with water or the like in a cooling step.

Next, the cooled product of the resin composition is pulverized to a desired particle size in a pulverization step. In the pulverizing step, the cooled product is coarsely pulverized with a pulverizer such as a crusher, a hammer mill, or a feather mill, for example. Thereafter, the coarsely pulverized product is further finely pulverized with, for example, KRYPTRON SYSTEM (manufactured by Kawasaki Heavy Industries, Ltd.), SUPER ROTOR (manufactured by Nisshin Engineering Inc.), turbo mill (manufactured by Turbo Kogyo Co., Ltd.), or an air jet type fine pulverizer. Thereafter, the finely pulverized product is classified, if necessary, by using a classifier or a sieving machine such as an inertial classification system Elbow-Jet Air Classifier (manufactured by Nittetsu Mining Co., Ltd.), a centrifugal classification system Turboplex (manufactured by Hosokawa Micron Corporation), TSP Separator (manufactured by Hosokawa Micron Corporation), or FACULTY (manufactured by Hosokawa Micron Corporation).

Thereafter, a surface-treatment of the toner particle is performed by heating to increase the circularity of the toner. The surface treatment can be performed by hot air with use of the surface treatment apparatus shown in FIG. 1, for example. A mixture, which is quantitatively supplied by a raw material constant quantity feeding unit 31, is introduced into an introduction pipe 33 installed on the vertical line of a raw material feeding unit, by compressed gas regulated by a compressed gas flow rate regulating unit 32. The mixture that has passed through the introduction pipe is uniformly dispersed by a conical protruding member 34 provided at the central portion of the raw material feeding unit, and introduced into supply pipes 35 that radially spread in eight directions, and then introduced into a treatment chamber 36 where heat treatment is performed. At this time, the flow of the mixture supplied to the treatment chamber 36 is controlled by a controlling unit 39, which is provided in the treatment chamber 36, to control the flow of the mixture. Therefore, the mixture supplied to the treatment chamber 36 is heat-treated while being rotating in the treatment chamber 36, and then cooled.

Hot air for the heat treatment of the supplied mixture is supplied from a hot air feeding unit 37, is uniformly distributed by a distribution member 42, is spirally rotated by a rotating member 43 to rotate the hot air in the direction of an outlet 41 of the hot air feeding unit, and is introduced into the treatment chamber 36. The configuration is that a plurality of vanes are included in the rotating member 43 to rotate the hot air, and the rotation of the hot air can be controlled by the number and the angle of the vanes. The hot air supplied into the treatment chamber 36 preferably has a temperature of 100° C. or more and 300° C. or less at the outlet of the hot air feeding unit 37. When the temperature at the outlet of the hot air feeding unit 37 is within the above range, a uniform spheroidizing treatment of the toner particle is possible while the toner particle is prevented from being fused and coalesced due to an excessive heating of the mixture.

Further, a heat-treated toner particle that has been subjected to the heat treatment is cooled by cold air supplied from a cold air feeding unit 38 (a cold air feeding unit 38-1, a cold air feeding unit 38-2, and a cold air feeding unit 38-3), the temperature of the cold air supplied from the cold air feeding unit 38 is preferably −20° C. or higher and 30° C. or lower. When the temperature of the cold air is within the above range, the heat-treated toner particle can be efficiently cooled, and the heat-treated toner particles are prevented from being fused or coalesced without disturbing a uniform spheroidizing treatment of the mixture. The absolute moisture content of the cold air is preferably 0.5 g/m$^3$ or more and 15.0 g/m$^3$ or less.

Next, the cooled heat-treated toner particle is collected by a collection unit 40 located at the lower end of the treatment chamber 36. Note that a blower (not illustrated) is provided on the distal end of the collection unit 40, and with this configuration the toner particle is suction-conveyed.

A powder particle feeding port 44 is provided so that the rotating direction of the supplied mixture and the rotating direction of the hot air are in the same direction, and the collection unit 40 of the surface treatment apparatus is provided on the outer peripheral portion of the treatment chamber so as to keep the rotating direction of the rotated powder particle. Furthermore, the cold air supplied from the cold air feeding unit 38 is configured to be supplied from the outer peripheral portion of the apparatus to the inner peripheral surface of the treatment chamber, from horizontal and tangential direction. The rotating direction of the toner particle supplied from the powder particle feeding port 44, the rotating direction of the cold air supplied from the cold air feeding unit, and the rotating direction of the hot air supplied from the hot air feeding unit 37 are all in the same direction. For this reason, no turbulence occurs in the treatment chamber 36, a rotating flow in the apparatus is enhanced, a strong centrifugal force is applied to the toner particle, and the dispersibility of the toner particle is further improved, so that there can be obtained a toner particle having a uniform shape and with less coalesced particles.

It is preferable from the viewpoint of suppressing the fogging that the toner particles have an average circularity of 0.960 or more and 0.980 or less since a non-electrostatic adhesion force can be kept low.

Thereafter, the toner particles are classified into two groups of fine powder toner particles and coarse powder toner particles. For example, an inertial classification system Elbow-Jet Air Classifier (manufactured by Nittetsu Mining Co., Ltd.) is used for the classification into two groups. The heat-treated toner particles classified into two groups are subjected to an external adding treatment thereby externally adding a desired amount of silica fine particle to the surface of each group of the heat-treated toner particle. Examples of the method of the external adding treatment include a method of stirring and mixing by use of a mixing apparatus as an external addition machine. Examples of the mixing apparatus that can be used as an external addition machine include the following: Double-cone mixer, V-type mixer, drum-type mixer, super mixer, Henschel mixer, Nauta mixer, MECHANO HYBRID (manufactured by NIPPON COKE & ENGINEERING CO., LTD.), NOBILTA (manufactured by Hosokawa Micron Corporation), and the like. At that time, the external adding treatment may add an external additive other than silica fine particle, such as a fluidizer, if necessary.

<Image Forming Method>

Figure 2:
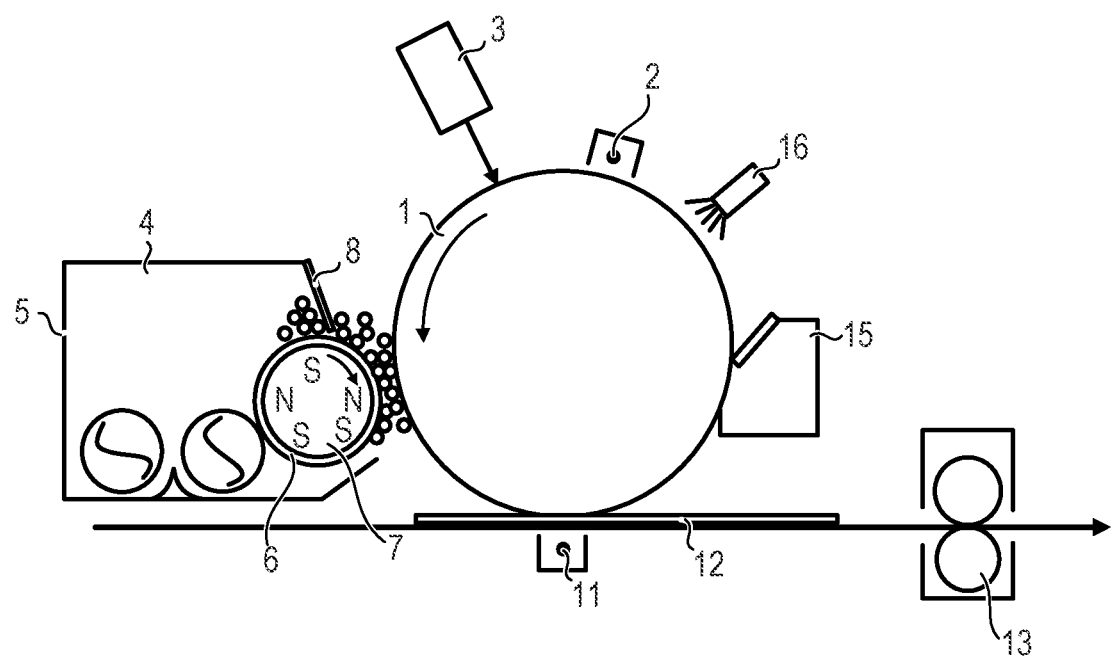
FIG. 2 is a diagram, illustrating an example of a schematic configuration of an electrophotographic apparatus, to example an image forming method.

In FIG. 2, an electrostatic latent image-bearing member 1 rotates in the direction of the arrow in the figure of the electrostatic latent image-bearing member 1. The electrostatic latent image-bearing member 1 is charged by a charger 2 which is a charging unit, and the charged surface of the electrostatic latent image-bearing member 1 is exposed by an exposure unit 3, which is an electrostatic latent image forming unit, to form an electrostatic latent image. The developing unit 4 includes a developing container 5 storing a two-component developer, and a developer bearing member 6 is disposed in a rotatable state, and a magnet 7 with a magnetic field generator is included in the developer bearing member 6. At least one magnet 7 is installed so as to be at a position facing the latent image-bearing member. The two-component developer is held on the developer bearing member 6 by the magnetic field of the magnet 7, the amount of the two-component developer is controlled by a controlling member 8, and the two-component developer is conveyed to a developing portion that faces the electrostatic latent image-bearing member 1. On the developing portion, a magnetic brush is formed by a magnetic field generated by the magnet 7. Thereafter, a developing bias formed by a superimposition of an alternating electric field on a direct electric field is applied between the developer bearing member 6 and the electrostatic latent image-bearing member 1, whereby an electrostatic latent image is visualized as a toner image.

Figure 3:
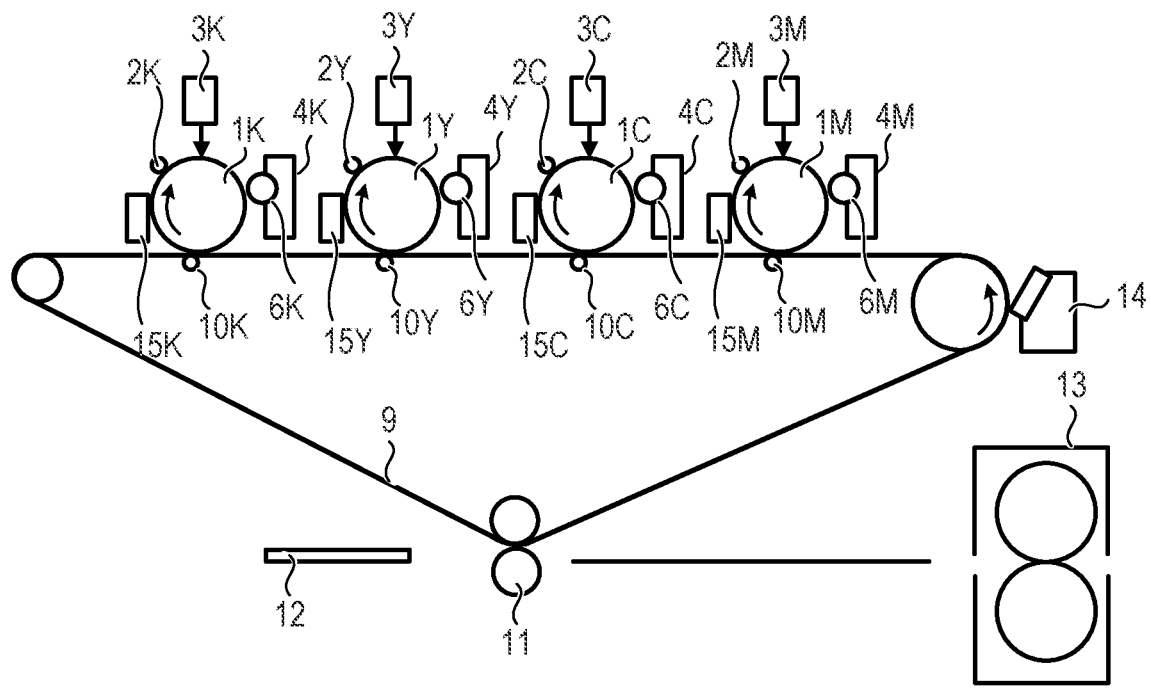
FIG. 3 is a diagram illustrating an example of a schematic diagram of a full-color image forming apparatus to which an image forming method is applied.

The toner image formed on the electrostatic latent image-bearing member 1 is electrostatically transferred to a recording medium 12 (transfer material) by a transfer charger 11. Here, as illustrated in FIG. 3, the toner image may be temporarily transferred from the electrostatic latent image-bearing member 1 to an intermediate transfer unit 9, and then electrostatically transferred to the recording medium 12. Thereafter, the recording medium 12 is conveyed to a fusing unit 13, where the toner is heated and pressurized to be fixed on the recording medium 12. Thereafter, the recording medium 12 is discharged as an output image to the outside of the apparatus. Note that, after the transfer step, the toner remained on the electrostatic latent image-bearing member 1 is removed by a cleaner 15. Thereafter, the electrostatic latent image-bearing member 1 cleaned by the cleaner 15 is electrically initialized by light illumination from a pre-exposure device 16, and the image forming operation described above is repeated.

FIG. 3 illustrates an example of a schematic diagram of an application of the image forming method to a full-color image forming apparatus. An arrangement of image forming units such as K, Y, C, and M and arrows indicating the rotation direction in FIG. 3 are not limited thereto. In FIG. 3, K, Y, C, and M represent black, yellow, cyan, and magenta, respectively. The electrostatic latent image-bearing members 1K, 1Y, 1C, and 1M rotate in the directions of the arrow in the drawing. Each electrostatic latent image-bearing member is charged by a charging unit, i.e., a charger 2K, 2Y, 2C, or 2M, and the charged surface of each electrostatic latent image-bearing member is exposed by an electrostatic latent image forming unit, i.e., an exposure device 3K, 3Y, 3C, or 3M to form an electrostatic latent image.

Thereafter, the electrostatic latent image is visualized as a toner image by a two-component developer carried on a developer carrying member 6K, 6Y, 6C, or 6M included in a developing device, i.e., a developing unit 4K, 4Y, 4C, or 4M. The toner image is transferred to an intermediate transfer unit 9 by a transfer unit, i.e., an intermediate transfer charger 10K, 10Y, 10C, or 10M. The toner image is further transferred to a recording medium 12 by a transfer unit, i.e., a transfer charger 11, and the recording medium 12 is heated and pressurized to be fixed by a fixing unit, i.e., a fusing unit 13, and then the toner image is outputted as an image. An intermediate transfer unit cleaner 14, which is a cleaning member of the intermediate transfer unit 9, collects the residual toner remained after transfer and the like.

<Measurement of Specific Resistance>

Figure 4A:
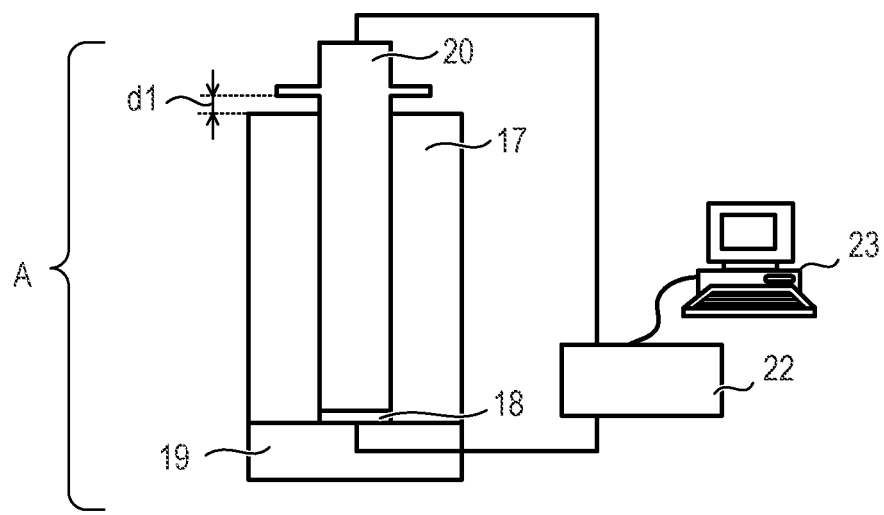
FIGS. 4A and 4B are diagrams each illustrating an example of a schematic configuration of an apparatus to be used for a measurement of the specific resistance of a magnetic carrier and a magnetic core.
Figure 4B:
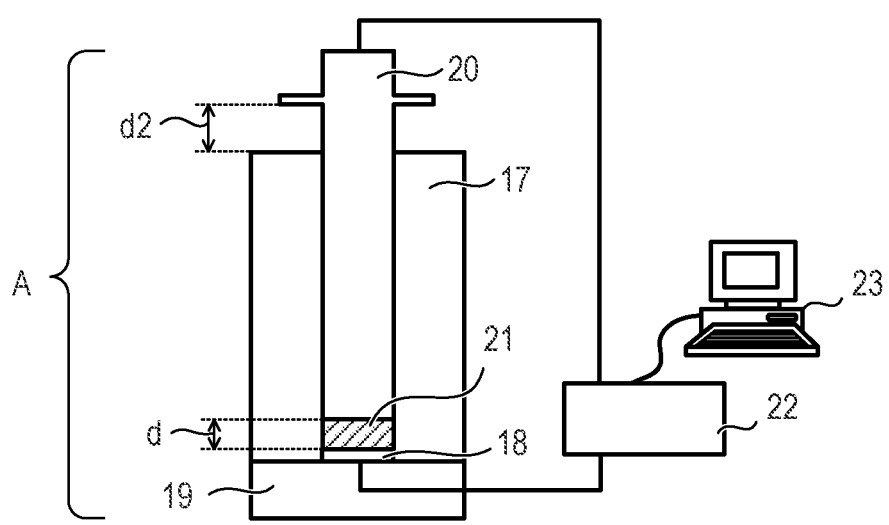

The measurement apparatus schematically illustrated in FIGS. 4A and 4B can be used to measure the specific resistance of the magnetic carrier and the magnetic core. Note that, the specific resistance of the magnetic carrier is measured at an electric field intensity of 2000 V/cm, and the specific resistance of the magnetic core is measured at an electric field intensity of 1000 V/cm.

A resistance measurement cell A includes: a cylindrical container 17 (made of PTFE resin) having a hole with a cross-sectional area of 2.4 cm²; a lower electrode 18 (made of stainless steel); a support pedestal 19 (made of PTFE resin); and an upper electrode 20 (made of stainless steel). The cylindrical container 18 is placed on the support pedestal 19A, a sample 21 (a magnetic carrier or a magnetic core) is filled into the container so as to have a thickness of about 1 mm, the upper electrode 20 is placed on the filled sample 5, and the thickness of the sample is measured. When a gap at the time when there is no sample is defined as d1 as illustrated in FIG. 4A, and a gap at the time there is a sample having a thickness of about 1 mm is defined as d2 as illustrated in FIG. 4B, the thickness d of the sample is calculated by the following equation.

$$d = d2 - d1 \, (mm)$$

At this time, the sample mass is appropriately adjusted so that the sample has a thickness d of 0.95 mm or more and 1.04 mm or less.

The specific resistance of the sample can be determined by measuring a current flowing through the electrodes when a DC voltage is applied between the electrodes. An electrometer 22 (Keithley 6517A manufactured by Keithley Instruments) and a processing computer 23 for control are used for the measurement. A control system manufactured by National Instruments and a control software (LabVIEW manufactured by National Instruments) can be used for the processing computer for control.

A contact area S between the sample and the electrode of 2.4 cm², and an actual measured value d of the sample thickness adjusted to be 0.95 mm or more and 1.04 mm or less are inputted as measurement conditions. The load of the upper electrode is 270 g and a maximum applied voltage is set to 1000 V.

Specific resistance $(\Omega \cdot cm)$ = (applied voltage (V)/measured current (A))×$S$ (cm²)/$d$ (cm)

Electric field intensity (V/cm) = applied voltage (V)/$d$ (cm)

The specific resistances of the magnetic carrier and the magnetic core at the electric field intensity described above are defined as respective readings on the graph for the specific resistances at the electric field intensity described above on the graph.

<Method of Measuring a Volume-Based 50% Diameter (D50)>

A laser diffraction/scattering particle size analyzer "Microtrac MT3300EX" (manufactured by Nikkiso Co., Ltd.) can be used for the measurement of the volume-based 50% diameters (D50) of the magnetic carrier and the magnetic core. The particle size analyzer described above equipped with a sample feeder for dry process measurement, "One-shot dry-type sample conditioner Turbotrac" (manufactured by Nikkiso Co., Ltd.) can be used for the measurement of the volume-based 50% diameter (D50). The sample feeding conditions of the sample feeder are that a dust collector is used as a source of vacuum, the air volume is about 33 l/sec, and the pressure is about 17 kPa. The conditions are automatically controlled with a software. The volume-based 50% diameter (D50) can be determined by finding a 50% particle diameter (D50) as a cumulative value over volume distribution. The attached software (version 10.3.3-202D) is used for the control and the analysis. The measurement conditions are as follows.

SetZero time: 10 seconds
Measurement time: 10 seconds
Number of measurements: once
Particle refractive index: 1.81%
Particle shape: non-spherical shape
Upper limit of measurement: 1408 μm
Lower limit of measurement: 0.243 μm
Measurement environment: 23° C., 50% RH <Measurement of Pore Diameter and Pore Volume of Porous Magnetic Particle>

First, the pore size distribution of the porous magnetic particle is measured by mercury porosimetry. The measurement principle is as follows. The amount of mercury intruded into the pores is measured at each time when the pressure applied to mercury is changed. The condition under which mercury can intrude into the pores can be expressed based on the force balance by an equation: PD=−4σ cos θ wherein P is the pressure, D is the pore diameter, and θ and σ are the contact angle and surface tension of mercury, respectively. If the contact angle and the surface tension are assumed to be constant, the pressure P and the pore diameter D into which mercury can intrude under the pressure are in inverse proportion. Therefore, the horizontal axis P of the P-V curve, which is obtained by measuring the pressure P and the liquid amount V of the intruded mercury at that pressure with varied pressure, is directly converted into the pore diameter based on the equation described above to obtain the pore distribution. As a measuring apparatus, a fully automatic multifunctional mercury porosimeter Pore-Master series/PoreMaster-GT series (manufactured by Yuasa Ionics Co., Ltd.), an automatic porosimeter Auto Pore IV 9500 series (manufactured by Shimadzu Corporation), or the like can be used.

For example, specific conditions and procedures using Auto Pore IV 9520 (manufactured by Shimadzu Corporation) are as follows.

| Measurement conditions | |
| --- | --- |
| Measurement environment | 20° C. |
| Measurement cell | Sample volume 5 cm³, intrusion volume 1.1 cm³, intended for powder samples |
| Measurement range | 2.0 psia (13.8 kPa) or more and 59989.6 psia (413.6 MPa) or less |
| Measurement step | 80 steps |
| (The measurement steps are adjusted such that the pore diameters are plotted at an equal interval in logarithmic scale.) | |
| Intrusion parameter | Evacuation pressure     50 μmHg |
| | Evacuation time     5.0 min |
| | Mercury intrusion pressure     2.0 psia (13.8 kPa) |
| | Equilibration time     5 secs |
| High pressure parameter | Equilibration time     5 secs |
| Mercury parameter | Advancing contact angle     130.0 degrees |
| | Receding contact angle     130.0 degrees |
| | Surface tension     485.0 mN/m (485.0 dynes/cm) |
| | Mercury density     13.5335 g/mL |

Measurement Procedure (1) About 1.0 g of porous magnetic particle is weighed and then placed in a sample cell.

The weighed value is inputted.

(2) Measurement is performed at a low pressure portion in a range from 2.0 psia (13.8 kPa) to 45.8 psia (315.6 kPa).

(3) Measurement is performed at a high pressure portion in a range from 45.9 psia (316.3 kPa) to 59989.6 psia (413.6 MPa).

(4) The pore size distribution is calculated from the mercury intrusion pressure and the mercury intrusion amount.

The procedures of (2), (3) and (4) are automatically performed with the software attached to the apparatus. From the pore diameter distribution measured as described above, a pore diameter with the largest differential pore volume within a pore diameter range of 0.1 μm to 3.0 μm is read out, and the read-out value is defined as a pore diameter with the largest differential pore volume. In addition, a pore volume is calculated by integrating the differential pore volume for a pore diameter range of 0.1 μm to 3.0 μm with use of the attached software.

<Method of Measuring the Weight Average Particle Diameter (D4) of Toner Particles>

The weight average particle diameter (D4) of the toner particles is calculated as follows. A pore electrical resistance method based accurate particle sizing and counting analyzer "Coulter counter Multisizer 3" (Registered trademark, manufactured by Beckman Coulter, Inc.) equipped with a 100 μm aperture tube is used as the measuring apparatus. The attached dedicated software "Beckman Coulter Multisizer 3 Version 3.51" (manufactured by Beckman Coulter, Inc.) is used for the settings of the measurement conditions and the analysis of the measurement data. Data are measured through 25,000 effective measurement channels, and the measured data are analyzed and the diameter is calculated. An electrolytic aqueous solution prepared by dissolving special grade sodium chloride in ion-exchanged water so as to have a concentration of about 1% by mass, for example, "ISOTON II" (manufactured by Beckman Coulter, Inc.) can be used for an electrolytic aqueous solution used for the measurement.

Note that, the following settings are made on the dedicated software prior to the measurement and the analysis. On the "Standard Operation Method (SOM) change panel" of the dedicated software, the total count number in the control mode is set to 50,000 particles, the number of runs is set to 1, and the Kd value is set to a calibrated value obtained by using "Standard particles 10.0 μm" (manufactured by Beckman Coulter, Inc.). By pressing the measure threshold/noise level button, the threshold and the noise level are automatically set. In addition, the current is set to 1600 μA, the gain is set to 2, the electrolyte solution is set to ISOTON II, and the Flush Aperture Tube in After Each Run is enabled. On the panel of "Convert Pulses to Size settings" of the dedicated software, the bin spacing is set to the logarithmic particle size, the number of particle size bin is set to 256 particle size bins, and the particle size range for the analysis is set to from 2 μm to 60 μm.

Specific measurement method is as follows.

(1) About 200 mL of an aqueous electrolyte solution is put in a 250 mL glass round-bottom beaker dedicated to the Multisizer 3, the beaker is placed on a sample stand, and the solution is stirred by a stirrer rod at 24 rotations per second in counterclockwise direction. Then, the contamination and air bubbles in the aperture tube are removed in advance with use of the function of "Flush Aperture Tube" of the analysis software.

(2) About 30 mL of the electrolytic aqueous solution is put in a 100 mL glass flat-bottom beaker, and about 0.3 mL of a diluent, which is a solution of the below-described "Contaminon N" diluted 3 times by mass with ion-exchanged water, is added thereto as a dispersant.

Contaminon N is a 10% by mass aqueous solution of a neutral detergent for washing precision measurement instruments, Contaminon N has a pH of 7 and contains a nonionic surfactant, an anionic surfactant, and an organic builder.

(3) A predetermined amount of ion-exchanged water is put in a water tank of an ultrasonic disperser in which 2 oscillators having an oscillation frequency of 50 kHz with phases shifted by 180 degrees are built-in, and whose electrical output is 120 W, "Ultrasonic Dispersion System Tetora 150" (manufactured by Nikkaki Bios Co., Ltd.), and then about 2 mL of Contaminon N is added to this water tank.

(4) The beaker as described in (2) is placed in a beaker retaining hole of the ultrasonic disperser, and the ultrasonic disperser is turned on. Then, the elevation of the beaker is adjusted to maximize the resonance state of the liquid surface of the electrolytic aqueous solution in the beaker.

(5) While the aqueous electrolyte solution in the beaker as described in (4) being irradiated with ultrasonic waves, about 10 mg of the toner is added by portions to disperse the toner in the aqueous electrolyte solution. Then, the ultrasonic dispersing treatment is further continued for 60 seconds. Note that, during the ultrasonic dispersion, the water temperature in the water tank is appropriately adjusted so as to be 10° C. or higher and 40° C. or lower.

(6) The toner-dispersed aqueous electrolyte solution described in (5) is added dropwise with a pipette to the round bottom beaker described in (1) installed in a sample stand, thereby adjusting the measurement concentration to be about 5%. Then, the measurement is continued until the number of measured particles reaches 50,000.

(7) The measurement data are analyzed with the dedicated software attached to the apparatus to calculate the weight average particle diameter (D4). Note that, the weight average particle diameter (D4) is a value indicated as "Mean Diameter" on the Analysis/Volume Statistics (Arithmetic mean) panel when Graphs/Volume % is selected on the dedicated software.

<Method of Measuring the Saturation Magnetization Intensity of Magnetic Core>

The saturation magnetization intensity of the magnetic core can be determined by using an oscillating magnetic field type magnetic property measuring apparatus (Vibrating sample magnetometer) or a direct current magnetization characteristic recording apparatus (B-H tracer). In Examples described later, Vibrating Sample Magnetometer BHV-30 (manufactured by Riken Denshi Co., Ltd) is used by following the procedure described below. A cylindrical plastic container in which the magnetic cores is sufficiently densely filled is used as a sample. The actual sample mass filled in the container is measured. Thereafter, the sample in the plastic container is bonded together with an instantaneous adhesive in order the sample not to move. The external magnetic field axis and the magnetization moment axis at 5000/4πkA/m are calibrated using a standard sample. The saturation magnetization intensity is measured at a sweep speed of 5 min/loop from a magnetization moment loop under application of an external magnetic field of 5000/4πkA/m. The saturation magnetization intensity ($Am^2/kg$) of the magnetic core is determined by dividing the measured values by the sample weight.

Advantageous Effects of the Disclosure

According to the present disclosure, there is provided a magnetic carrier with which a high stability for image density and developability in the long service life can be obtained and which is excellent in suppressing fogging and toner scattering.

EXAMPLES

Production Example of Porous Magnetic Particle

Step 1 (Weighing/Mixing Step)
The following ferrite raw materials were weighed to be prepared.

| | |
|---|---|
| $Fe_2O_3$ | 61.7% by mass |
| $MnCO_3$ | 34.2% by mass |

-continued

| | |
|---|---|
| $Mg(OH)_2$ | 3.0% by mass |
| $SrCO_3$ | 1.1% by mass |

These raw materials were pulverized and mixed for 2 hours with a dry process ball mill by using zirconia balls (φ 10 mm).

Step 2 (Calcination Step)
After the raw materials had been pulverized and mixed, the mixture was calcined at 950° C. for 2 hours in the air using a burner type baking furnace to prepare a calcined ferrite. The composition of the ferrite is as follows.

$(MnO)_a(MgO)_b(SrO)_c(Fe_2O_3)_d$

In the above formula, a=0.40, b=0.07, c=0.01, and d=0.52

Step 3 (Pulverization Step)
After the calcined ferrite had been pulverized to about 0.5 mm with a crusher, 30 parts by mass of water was added to 100 parts by mass of the calcined ferrite, and the mixture was pulverized for 2 hours with a liquid process ball mill by using zirconia balls (φ 1.0 mm). After the balls had been removed, the mixture was pulverized with a liquid process bead mill for 3 hours by using zirconia beads (φ 1.0 mm) to obtain a ferrite slurry.

Step 4 (Granulation Step)
To the ferrite slurry, 2.0 parts by mass of polyvinyl alcohol with respect to 100 parts by mass of the calcined ferrite was added as a binder, and the resulting mixture was granulated into a spherical particle of 40 μm with a spray dryer (manufactured by Ohkawara Kakohki Co., Ltd.).

Step 5 (Main Firing Step)
In order to control the firing atmosphere, an electric furnace was used, in which the spherical particle was fired at 1150° C. for 4 hours under a nitrogen atmosphere (at an oxygen concentration of 1.0 vol %).

Step 6 (Screening Step)
After aggregated particles had been crushed, a coarse particle was removed by sifting with a sieve with a mesh size of 250 μm to obtain a porous magnetic particle. This porous magnetic particle was used as a magnetic core 1. The physical properties of the obtained magnetic core 1 are summarized in Table 1.

Step 7 (Resin Filling Step)
Into a stirring container of a mixing stirrer (Trade name: Universal stirrer NDMV type, manufactured by DALTON CORPORATION), 100.0 parts by mass of the magnetic core 1 was added, and then nitrogen was introduced thereto in keeping the temperature at 60° C. while the pressure being reduced to 2.3 kPa. Furthermore, a silicone resin solution was added dropwise under reduced pressure so that the resin component became 7.5 parts by mass with respect to the magnetic core 1, and the stirring was continued as it was for 2 hours after the completion of the dropwise addition. Thereafter, the temperature was raised to 70° C., and the solvent was removed under reduced pressure, and then the silicone resin composition contained in the silicone resin solution was filled into the particle of the magnetic core 1 to obtain a filled core particle. After cooling, the resultant filled core particle was transferred into a mixer (Trade name: Drum mixer UD-AT type, manufactured by Sugiyama Heavy Industries, Co., Ltd.) whose rotatable mixing container including a spiral vane, and the temperature was raised to 220° C. at a temperature raising rate of 2° C./min under a nitrogen atmosphere and normal pressure. The filled core particle was further heated and stirred at 220° C. for 60 minutes to cure the resin. After the particle had been heat treated, the low-magnetic product was separated by magnetic separation, and then the remaining particles were classified with a sieve having an opening of 150 μm to obtain a magnetic core 2. The physical properties of the obtained magnetic core 2 are shown in Table 1.

Production Example of a Ferrite Core Particle

Step 1 (Weighing/Mixing Step)
The following ferrite raw materials were prepared by weighing as in the following relative ratios.

| | |
|---|---|
| $Fe_2O_3$ | 61.7% by mass |
| $MnCO_3$ | 34.2% by mass |
| $Mg(OH)_2$ | 3.0% by mass |
| $SrCO_3$ | 1.1% by mass |

These raw materials were pulverized and mixed for 2 hours with a dry process ball mill by using zirconia balls ((φ 10 mm).
Step 2 (Calcination Step)
After the raw materials had been pulverized and mixed, then the mixture was calcined at 1000° C. for 2 hours in the air using a burner type firing furnace to prepare a calcined ferrite. The composition of the ferrite was as follows.

$$(MnO)_a(MgO)_b(SrO)_c(Fe_2O_3)_d$$

In the above formula, a=0.40, b=0.07, c=0.01, and d=0.52
Step 3 (Pulverization Step)
After the calcined ferrite had been pulverized to about 0.5 mm with a crusher, 30 parts by mass of water was added thereto with respect to 100 parts by mass of the calcined ferrite, and then the mixture was pulverized for 2 hours with a liquid process ball mill by using stainless balls (φ 1.0 mm). After the balls had been removed, the mixture was pulverized with a liquid process bead mill by using stainless steel balls (φ 1.0 mm) for 3 hours to obtain a ferrite slurry.
Step 4 (Granulation Step)
To the ferrite slurry, 2.0 parts by mass of polyvinyl alcohol was added as a binder thereto with respect to 100 parts by mass of the calcined ferrite, and the resultant mixture was granulated into a spherical particle of 45 μm with a spray dryer (manufactured by Ohkawara Kakohki Co., Ltd.).
Step 5 (Main Firing Step)
In order to control the firing atmosphere, an electric furnace was used for the firing at 1200° C. for 6 hours under a nitrogen atmosphere (at an oxygen concentration of 0.6 vol %).

Step 6 (Screening Step)
After an aggregated particle had been crushed, a coarse particle was removed by sifting with a sieve having a mesh size of 250 μm to obtain a ferrite core particle. This ferrite core particle was used as a magnetic core 3. The physical properties of the obtained magnetic core 3 are shown in Table 3.

Production Example of Magnetic Body-Dispersed Resin Core Particle

The following materials were prepared.

Magnetite fine particle (having a spherical shape, a number average particle diameter of 250 nm, a saturation magnetization of 50 $Am^2$/kg, a residual magnetization of 4.2 $Am^2$/kg, a coercive force of 4.4 kA/m, a specific resistance of $3.3 \times 10^6$ Ω·cm at an electric field intensity of 1000 V/cm)

Silane-based coupling agent: 3-(2-aminoethylaminopropyl)trimethoxysilane

The magnetite fine particle, and 3.0% by mass of the silane-based coupling agent with respect to the mass of the magnetite fine particle were introduced into a container. Then, the mixture was rapidly mixed and stirred at a temperature of 100° C. or higher in the container to perform a surface treatment of the magnetite fine particle.

Next, the following materials were prepared.

| | |
|---|---|
| Phenol | 10 parts by mass |
| Formaldehyde solution (an aqueous solution containing 37% by mass of formaldehyde) | 16 parts by mass |
| The surface-treated magnetite fine particle | 84 parts by mass |

These were introduced into a reaction kettle and mixed well at a temperature of 40° C. Thereafter, while being stirred, the mixture was heated to a temperature of 85° C. at an average temperature rising rate of 3° C./min, and 4 parts by mass of 28% by mass ammonia water and 25 parts by mass of water were added to the reaction kettle. The mixture was held at a temperature of 85° C., and polymerized for 3 hours, then cured. The peripheral speed of the impeller at this time was set to 1.8 m/sec. After having been polymerized, the mixture was cooled to a temperature of 30° C., and water was added thereto. A precipitate obtained by removing a supernatant was washed with water and then further air-dried. The resultant air-dried product was dehydrated at a temperature of 60° C. under reduced pressure (at 5 hPa or below) to obtain a magnetic body-dispersed resin core particle. This particle was used as a magnetic core 4. The physical properties of the obtained magnetic core 4 are shown in Table 1.

TABLE 1

| Magnetic core | Volume-based 50% diameter (D50) (μm) | Apparent density (g/cm³) | True density (g/cm³) | Specific resistance (Ω · cm) | Saturation magnetization (Am²/kg) |
|---|---|---|---|---|---|
| 1 | 38 | 1.70 | 4.88 | $4.0 \times 10^7$ | 62 |
| 2 | 40 | 1.85 | 3.95 | $4.4 \times 10^7$ | 60 |
| 3 | 46 | 2.35 | 4.9 | $3.6 \times 10^7$ | 69 |
| 4 | 35 | 1.90 | 3.53 | $7.3 \times 10^{10}$ | 49 |

Production Example of Resin A1

To a four-necked flask equipped with a reflux condenser, a thermometer, a nitrogen inlet tube, and a ground joint type stirrer, 95.2% by mass of a monomer corresponding to the unit Y1 and 4.8% by mass of a silicone-containing acrylic monomer corresponding to the unit Y2 were added. The structures of the substituents included in the units Y1 and Y2 are shown in Table 2. Furthermore, 100 parts by mass of toluene, 100 parts by mass of methyl ethyl ketone, and 2.0 parts by mass of azobisisovaleronitrile were added to 106 parts by mass of the monomer mixture. The obtained mixture was held at 70° C. for 10 hours under nitrogen stream, and after the completion of the polymerization reaction, the resultant was repeatedly washed to obtain a resin A1 solution (solid content: 35% by mass). The value m of the summation of the number of units Y1 and the number of units Y2 was 70, as calculated by using gel permeation chromatography (GPC) for this solution.

Production Examples of Resins A2 to 19

The type and the used amount "y1" (% by mass) of a monomer corresponding to the unit Y1, the type and the used amount "y2" (% by mass) of a silicone-containing acrylic monomer corresponding to the unit Y2, the value of n, and the total amount X of the resin A were changed as shown in Table 2. Resin A2 to 19 was obtained in the same manner as in the production example of Resin A1 except for the above-mentioned modification.

TABLE 2

| | Unit Y1 | | | | Unit Y2 | | |
|---|---|---|---|---|---|---|---|
| Resin A | R1 | R2 | Molar ratio in Unit Y1 | y1 (% by mass) | R3 | R4 | R5 |
| A1 | Methyl group | 2-hydroxyethyl group | 7.0 | 95.2 | Methyl group | Hydrogen | Trimethylene |
| | Methyl group | 2-carboxyethyl group | 0.0 | | | | |
| | Methyl group | Butyl group | 39.5 | | | | |
| | Methyl group | Methyl group | 53.5 | | | | |
| A2 | Methyl group | 2-hydroxyethyl group | 0.0 | 95.2 | Hydrogen | Hydrogen | Trimethylene |
| | Methyl group | 2-carboxyethyl group | 7.0 | | | | |
| | Methyl group | Butyl group | 39.5 | | | | |
| | Methyl group | Methyl group | 53.5 | | | | |
| A3 | Methyl group | 2-hydroxyethyl group | 7.0 | 95.2 | Hydrogen | Methyl group | Trimethylene |
| | Methyl group | 2-carboxyethyl group | 0.0 | | | | |
| | Methyl group | Butyl group | 39.5 | | | | |
| | Methyl group | Methyl group | 53.5 | | | | |
| A4 | Methyl group | 2-hydroxyethyl group | 7.0 | 95.2 | Methyl group | Hydrogen | Methylene |
| | Methyl group | 2-carboxyethyl group | 0.0 | | | | |
| | Methyl group | Butyl group | 39.5 | | | | |
| | Methyl group | Methyl group | 53.5 | | | | |
| A5 | Methyl group | 2-hydroxyethyl group | 7.0 | 95.2 | Methyl group | Hydrogen | Decamethylene |
| | Methyl group | 2-carboxyethyl group | 0.0 | | | | |
| | Methyl group | Butyl group | 39.5 | | | | |
| | Methyl group | Methyl group | 53.5 | | | | |

TABLE 2-continued

| | | | | | | | | |
|---|---|---|---|---|---|---|---|---|
| A6 | Methyl group | 2-hydroxyethyl group | 0.0 | 95.2 | Methyl group | Hydrogen | Trimethylene | |
| | Methyl group | 2-carboxyethyl group | 7.0 | | | | | |
| | Methyl group | Butyl group | 39.5 | | | | | |
| | Methyl group | Methyl group | 53.5 | | | | | |
| A7 | Methyl group | 2-hydroxyethyl group | 7.0 | 95.2 | Methyl group | Hydrogen | Trimethylene | |
| | Methyl group | 2-carboxyethyl group | 0.0 | | | | | |
| | Methyl group | Butyl group | 39.5 | | | | | |
| | Methyl group | Methyl group | 53.5 | | | | | |
| A8 | Methyl group | 2-hydroxyethyl group | 7.0 | 95.2 | Methyl group | Hydrogen | Trimethylene | |
| | Methyl group | 2-carboxyethyl group | 0.0 | | | | | |
| | Methyl group | Butyl group | 39.5 | | | | | |
| | Methyl group | Methyl group | 53.5 | | | | | |
| A9 | Methyl group | 2-hydroxyethyl group | 3.5 | 95.2 | Methyl group | Hydrogen | Trimethylene | |
| | Methyl group | 2-carboxyethyl group | 3.5 | | | | | |
| | Methyl group | Butyl group | 39.5 | | | | | |
| | Methyl group | Methyl group | 53.5 | | | | | |
| A10 | Methyl group | 2-hydroxyethyl group | 0.0 | 95.2 | Methyl group | Hydrogen | Trimethylene | |
| | Methyl group | 2-carboxyethyl group | 0.0 | | | | | |
| | Methyl group | Butyl group | 42.5 | | | | | |
| | Methyl group | Methyl group | 57.5 | | | | | |
| A11 | Methyl group | 2-hydroxyethyl group | 7.0 | 95.2 | Methyl group | Hydrogen | Trimethylene | |
| | Methyl group | 2-carboxyethyl group | 0.0 | | | | | |
| | Methyl group | Butyl group | 39.5 | | | | | |
| | Methyl group | Methyl group | 53.5 | | | | | |
| A12 | Methyl group | 2-hydroxyethyl group | 7.0 | 95.2 | Methyl group | Hydrogen | Trimethylene | |
| | Methyl group | 2-carboxyethyl group | 0.0 | | | | | |
| | Methyl group | Butyl group | 39.5 | | | | | |
| | Methyl group | Methyl group | 53.5 | | | | | |
| A13 | Methyl group | 2-hydroxyethyl group | 7.0 | 95.2 | Methyl group | Hydrogen | Trimethylene | |
| | Methyl group | 2-carboxyethyl group | 0.0 | | | | | |
| | Methyl group | Butyl group | 39.5 | | | | | |
| | Methyl group | Methyl group | 53.5 | | | | | |

TABLE 2-continued

| | | | | | | | |
|---|---|---|---|---|---|---|---|
| A14 | Methyl group | 2-hydroxyethyl group | 7.0 | 95.2 | Methyl group | Hydrogen | Trimethylene |
| | Methyl group | 2-carboxyethyl group | 0.0 | | | | |
| | Methyl group | Butyl group | 39.5 | | | | |
| | Methyl group | Methyl group | 53.5 | | | | |
| A15 | Methyl group | 2-hydroxyethyl group | 7.0 | 95.2 | Methyl group | Hydrogen | Trimethylene |
| | Methyl group | 2-carboxyethyl group | 0.0 | | | | |
| | Methyl group | Butyl group | 39.5 | | | | |
| | Methyl group | Methyl group | 53.5 | | | | |
| A16 | Methyl group | 2-hydroxyethyl group | 7.0 | 50 | Methyl group | Hydrogen | Trimethylene |
| | Methyl group | 2-carboxyethyl group | 0.0 | | | | |
| | Methyl group | Butyl group | 39.5 | | | | |
| | Methyl group | Methyl group | 53.5 | | | | |
| A17 | Methyl group | 2-hydroxyethyl group | 7.0 | 96.6 | Methyl group | Hydrogen | Trimethylene |
| | Methyl group | 2-carboxyethyl group | 0.0 | | | | |
| | Methyl group | Butyl group | 39.5 | | | | |
| | Methyl group | Methyl group | 53.5 | | | | |
| A18 | Methyl group | 4-Hydroxyethyl group | 7.0 | 95.2 | Methyl group | Hydrogen | Trimethylene |
| | Methyl group | 4-carboxyethyl group | 0.0 | | | | |
| | Methyl group | Butyl group | 39.5 | | | | |
| | Methyl group | Methyl group | 53.5 | | | | |
| A19 | Methyl group | 4-Hydroxyethyl group | 7.0 | 98 | Methyl group | Hydrogen | Trimethylene |
| | Methyl group | 4-carboxyethyl group | 0.0 | | | | |
| | Methyl group | Butyl group | 39.5 | | | | |
| | Methyl group | Methyl group | 53.5 | | | | |

| | | Unit Y2 | | | | | | |
|---|---|---|---|---|---|---|---|---|
| Resin A | R6 | R7 | y2 (% by mass) | n | m | X (% by mass) | (y1 + y2)/X | y1/y2 |
| A1 | Methyl group | Methyl group | 4.8 | 6 | 70 | 105 | 0.95 | 19.8 |
| A2 | Methyl group | Methyl group | 4.8 | 6 | 70 | 105 | 0.95 | 19.8 |
| A3 | Methyl group | Methyl group | 4.8 | 6 | 70 | 105 | 0.95 | 19.8 |
| A4 | Methyl group | Methyl group | 4.8 | 6 | 70 | 105 | 0.95 | 19.8 |
| A5 | Methyl group | Methyl group | 4.8 | 6 | 70 | 105 | 0.95 | 19.8 |

TABLE 2-continued

| | | | | | | | | |
|---|---|---|---|---|---|---|---|---|
| A6 | Propyl group | Methyl group | 4.8 | 6 | 70 | 105 | 0.95 | 19.8 |
| A7 | Ethyl group | Methyl group | 4.8 | 6 | 70 | 105 | 0.95 | 19.8 |
| A8 | Propyl group | Methyl group | 4.8 | 6 | 70 | 105 | 0.95 | 19.8 |
| A9 | Butyl group | Methyl group | 4.8 | 6 | 70 | 105 | 0.95 | 19.8 |
| A10 | Methyl group | Hydroxy group | 4.8 | 6 | 70 | 105 | 0.95 | 19.8 |
| A11 | Hexyl group | Methyl group | 4.8 | 6 | 65 | 105 | 0.95 | 19.8 |
| A12 | Cyclohexyl group | Methyl group | 4.8 | 6 | 75 | 105 | 0.95 | 19.8 |
| A13 | Methyl group | Methyl group | 4.8 | 5 | 40 | 105 | 0.95 | 19.8 |
| A14 | Methyl group | Methyl group | 4.8 | 60 | 260 | 105 | 0.95 | 19.8 |
| A15 | Methyl group | Methyl group | 4.8 | 70 | 40 | 105 | 0.95 | 19.8 |
| A16 | Methyl group | Methyl group | 50 | 2 | 40 | 111 | 0.90 | 1.0 |
| A17 | Methyl group | Methyl group | 3.4 | 120 | 40 | 100 | 1.00 | 28.4 |
| A18 | Methyl group | Methyl group | 4.8 | 1 | 70 | 105 | 0.95 | 19.8 |
| A19 | Methyl group | Methyl group | 2 | 1 | 70 | 105 | 0.95 | 49.0 |

Preparation Example of Macromonomer

The macromonomer used for the resin B can be synthesized, for example, by the following method. The following raw materials were prepared as in the following relative ratios.

| | |
|---|---|
| Methacrylic acid chloride | 1.7% by mass |
| Polymethyl methacrylate having a hydroxyl group at its one terminal (Mw; about 5000) | 98.3% by mass |

These were added to a four-necked flask equipped with a reflux condenser, a thermometer, a nitrogen inlet tube, and a ground joint type stirrer. Furthermore, 100 parts by mass of THF and 1.0 parts by mass of 4-tert-butylcatechol was added to 100 parts by mass of the monomer mixture, then the mixture was heated and refluxed for 5 hours under nitrogen stream, after the completion of the reaction, the reactant was washed with sodium hydrogen carbonate to obtain a solution of a methacrylic acid macromonomer.

Production Example of Resin B1

The following monomers were prepared as in the following relative ratios.

| | |
|---|---|
| Cyclohexyl methacrylate | 74.5% by mass |
| Methyl methacrylate | 0.5% by mass |
| Methacrylic acid macromonomer | 25% by mass |

These were added to a four-necked flask equipped with a reflux condenser, a thermometer, a nitrogen inlet tube, and a ground joint type stirrer. Furthermore, 100 parts by mass of toluene, 100 parts by mass of methyl ethyl ketone, and 2.0 parts by mass of azobisisovaleronitrile were added to 106 parts by mass of the monomer mixture. The obtained mixture was held at 70° C. for 10 hours under nitrogen stream, and after the completion of the polymerization reaction, the reactant was washed repeatedly to obtain a solution of the resin B1 (solid content: 35% by mass). The weight average molecular weight of resin B1 was 57,000, as measured by gel permeation chromatography (GPC) using this solution. SPb of the resin B1 is 10.2.

Production Example of Resin B2

The following monomers were prepared as in the following relative ratios.

| | |
|---|---|
| Cyclohexyl methacrylate | 74.5% by mass |
| Methyl methacrylate | 25.5% by mass |

These were added to a four-necked flask equipped with a reflux condenser, a thermometer, a nitrogen inlet tube, and a ground joint type stirrer. Furthermore, 100 parts by mass of toluene, 100 parts by mass of methyl ethyl ketone, and 2.0 parts by mass of azobisisovaleronitrile were added to 106 parts by mass of the monomer mixture. The obtained mixture was held at 70° C. for 10 hours under nitrogen stream, and after the completion of the polymerization reaction, the reactant was washed repeatedly to obtain a solution of the resin B2 (solid content: 35% by mass). The weight average molecular weight of the resin B2 was 68,000, as measured by gel permeation chromatography (GPC) using this solution. SPb of the resin B2 is 10.2.

Production Example of Resin B3

The following monomers were prepared as in the following relative ratios.

| | |
|---|---|
| Methyl methacrylate | 75% by mass |
| Methacrylic acid macromonomer | 25% by mass |

These were added to a four-necked flask equipped with a reflux condenser, a thermometer, a nitrogen inlet tube, and a ground joint type stirrer. Furthermore, 100 parts by mass of toluene, 100 parts by mass of methyl ethyl ketone, and 2.0 parts by mass of azobisisovaleronitrile were added to 106 parts by mass of the monomer mixture. The obtained mixture was held at 70° C. for 10 hours under nitrogen stream, and after the completion of the polymerization reaction, the reactant was washed repeatedly to obtain a solution of the resin B3 (solid content: 35% by mass). The weight average molecular weight of resin B3 was 35,000 as measured by gel permeation chromatography (GPC) using this solution. SPb of the resin B3 is 9.9.

Production Example of Resin B4

The following monomers were prepared as in the following relative ratios.

| | |
|---|---|
| Cyclohexyl methacrylate | 30% by mass |
| Methyl methacrylate | 45% by mass |
| Methacrylic acid macromonomer | 25% by mass |

These were added to a four-necked flask equipped with a reflux condenser, a thermometer, a nitrogen inlet tube, and a ground joint type stirrer. Furthermore, 100 parts by mass of toluene, 100 parts by mass of methyl ethyl ketone, and 2.0 parts by mass of azobisisovaleronitrile were added to 106 parts by mass of the monomer mixture. The obtained mixture was held at 70° C. for 10 hours under nitrogen stream, and after the completion of the polymerization reaction, the resultant was washed repeatedly to obtain a solution of the resin B4 (solid content: 35% by mass). The weight average molecular weight of resin B4 was 36,000 as measured by gel permeation chromatography (GPC) using this solution. SPb of the resin B4 is 10.1.

Production Example of Resin B5

The following monomer was prepared.

| | |
|---|---|
| Hexyl methacrylate | 100% by mass |

This monomer was added to a four-neck flask equipped with a reflux condenser, a thermometer, a nitrogen inlet tube, and a ground joint type stirrer. Furthermore, 100 parts by mass of toluene, 100 parts by mass of methyl ethyl ketone, and 2.0 parts by mass of azobisisovaleronitrile were added to 106 parts by mass of the monomer mixture. The obtained mixture was held at 70° C. for 10 hours under nitrogen stream, and after the completion of the polymerization reaction, the reactant was washed repeatedly to obtain a solution of the resin B5 (solid content: 35% by mass). The weight average molecular weight of the resin B5 was 48,000 as measured by gel permeation chromatography (GPC) using this solution. SPb of the resin B5 is 9.3.

Production Example of Resin B6

The following monomers were prepared as in the following relative ratios.

| | |
|---|---|
| (1-hydroxyethyl) methacrylate | 35.4% by mass |
| Methyl methacrylate | 64.6% by mass |

These were added to a four-necked flask equipped with a reflux condenser, a thermometer, a nitrogen inlet tube, and a ground joint type stirrer. Furthermore, 100 parts by mass of toluene, 100 parts by mass of methyl ethyl ketone, and 2.0 parts by mass of azobisisovaleronitrile were added to 106 parts by mass of the monomer mixture. The obtained mixture was held at 70° C. for 10 hours under nitrogen stream, and after the completion of the polymerization reaction, the reactant was washed repeatedly to obtain a solution of the resin B5 (solid content: 35% by mass). The weight average molecular weight of the resin B6 was 37,000 as measured by gel permeation chromatography (GPC) using this solution. SPb of the resin B6 is 11.4.

Production Example of Resin B7

The following materials were prepared.

| | |
|---|---|
| Polydimethylsiloxane (having an average polymerization degree of 55) | 5.0 parts by mass |
| Methyltrichlorosilane | 25.0 parts by mass |
| Water | 40.0 parts by mass |
| Methyl isobutyl ketone | 30.0 parts by mass |

Among them, water and methyl isobutyl ketone were added to a reaction vessel equipped with a reflux condenser, a dropping funnel, and a stirrer, and vigorously stirred so as not to form two layers, and then polydimethylsiloxane was added thereto, and the mixture was further stirred, thereafter the reaction vessel was placed in an ice bath. At the time when the temperature of the mixture in the reaction vessel reached 10° C., methyltrichlorosilane was added dropwise to the mixture. After the completion of the dropwise addition, the resultant was washed, thereafter the solvent was distilled off under reduced pressure to obtain a resin B7. SPb of the resin B7 is 10.2.

Production Example of Resin C1

The following materials were prepared as in the following relative ratios.

| | |
|---|---|
| Polydimethylsiloxane dichloride (Mw: about 10,000) | 30.0% by mass |
| Polymethyl methacrylate having a hydroxyl group at its one terminal (Mw; about 5000) | 70.0% by mass |

These were added to a four-necked flask equipped with a reflux condenser, a thermometer, a nitrogen inlet tube, and a ground joint type stirrer. Thereafter, the mixture was heated and refluxed for 5 hours under nitrogen stream, and after the completion of the reaction, the mixture was washed with sodium hydrogen carbonate to obtain a solution of the resin C1.

Production Examples of Resins C2 and C3

The types and the mixing ratios of the used siloxane raw material and the used acrylic raw material were changed from the production example of the resin C1 as shown in Table 3. Except for the above modification, the resins C2 and C3 were obtained in the same manner as in the production example of the resin C1.

TABLE 3

| Resin C | Siloxane raw material | | | Acrylic raw material | | |
|---|---|---|---|---|---|---|
| | Type | Molecular weight | Mixing ratio (% by mass) | Type | Molecular weight | Mixing ratio (% by mass) |
| C1 | Polydimethylsiloxane dichloride | 10000 | 30.0 | Poly(methyl acrylate) | 5000 | 70.0 |
| C2 | Polydimethylsiloxane chloride | 10000 | 40.0 | Poly(methyl acrylate) | 10000 | 60.0 |
| C3 | Polydimethylsiloxane dichloride | 2000 | 10.0 | Poly(methyl acrylate) | 10000 | 90.0 |

<Resin Coating Step>

Production Example of Magnetic Carrier 1

The magnetic core 2 was first added into a planetary motion mixer (Trade name: Nauta Mixer VN type, manufactured by Hosokawa Micron Corporation) which was kept at a temperature of 60° C. under reduced pressure (1.5 kPa), and subsequently a resin solution obtained by mixing the resin A1 and the resin B1 at a ratio shown in Table 4 was added thereto. The addition amounts of the magnetic core 2 and of respective resins were adjusted so as the solid content of the resin component to be 2.0 parts by mass with respect to 100 parts by mass of the magnetic core 2. The resin solution was added as follows. First, a ⅓ amount of the resin solution was added, and the solvent removal for 20 minutes and the coating operation were performed. Then, another ⅓ amount of the resin solution was further added, and the solvent removal for 20 minutes and the coating operation were performed, furthermore, another ⅓ amount of the resin solution was added, and the solvent removal for 20 minutes and the coating operation were performed. Thereafter, the magnetic carrier coated with the coating resin composition was transferred into a mixer (Trade name: Drum mixer UD-AT type, manufactured by Sugiyama Heavy Industries, Ltd.) whose rotatable mixing container including a spiral vane. The magnetic carrier was heat-treated at a temperature of 120° C. for 2 hours under a nitrogen atmosphere while being stirred by the mixing container rotating at 10 rotations per minute. The low-magnetic products were separated and removed from the obtained magnetic carrier 1 by magnetic separation, and the magnetic carrier 1 remained after the separating treatment was passed through a sieve with an opening of 150 μm, and then classified with an air classifier. With this step, a magnetic carrier 1 having a volume-based 50% diameter (D50) of 39.1 μm was obtained. The analysis results of the surface layer of the obtained magnetic carrier 1 are shown in Table 5.

Production Examples of Magnetic Carriers 2 to 38

The type of the magnetic core and the composition of the resin solution used for coating were changed from the production example of the magnetic carrier 1 as shown in Table 4. Except for the above modification, the magnetic carriers 2 to 38 were obtained in the same manner as the manufacturing example of the magnetic carrier 1. The analysis results of the surface layer of the obtained magnetic carriers 2 to 38 are shown in Table 5.

TABLE 4

| Magnetic carrier | Magnetic core | Silicone-modified resin | | Resin B | | SP value | | |
|---|---|---|---|---|---|---|---|---|
| | | Type | Mixing ratio (% by mass) | Type | Mixing ratio (% by mass) | SPa | SPb | \|SPa − SPb\| |
| 1 | 2 | A1 | 3 | B1 | 97 | 10.0 | 10.2 | 0.2 |
| 2 | 2 | A2 | 3 | B1 | 97 | 9.8 | 10.2 | 0.4 |
| 3 | 2 | A3 | 3 | B1 | 97 | 10.0 | 10.2 | 0.2 |
| 4 | 2 | A4 | 3 | B1 | 97 | 10.0 | 10.2 | 0.2 |
| 5 | 2 | A5 | 3 | B1 | 97 | 10.0 | 10.2 | 0.2 |
| 6 | 2 | A6 | 3 | B1 | 97 | 9.8 | 10.2 | 0.4 |
| 7 | 2 | A7 | 3 | B1 | 97 | 10.0 | 10.2 | 0.2 |
| 8 | 2 | A8 | 3 | B1 | 97 | 10.0 | 10.2 | 0.2 |
| 9 | 2 | A9 | 3 | B1 | 97 | 9.9 | 10.2 | 0.3 |
| 10 | 2 | A10 | 3 | B1 | 97 | 9.7 | 10.2 | 0.5 |
| 11 | 2 | A11 | 3 | B1 | 97 | 10.0 | 10.2 | 0.2 |
| 12 | 2 | A12 | 3 | B1 | 97 | 10.0 | 10.2 | 0.2 |
| 13 | 3 | A1 | 3 | B1 | 97 | 10.0 | 10.2 | 0.2 |
| 14 | 4 | A1 | 3 | B1 | 97 | 10.0 | 10.2 | 0.2 |
| 15 | 2 | A1 | 1 | B1 | 99 | 10.0 | 10.2 | 0.2 |
| 16 | 2 | A1 | 10 | B1 | 90 | 10.0 | 10.2 | 0.2 |
| 17 | 2 | A1 | 20 | B1 | 80 | 10.0 | 10.2 | 0.2 |
| 18 | 2 | A1 | 50 | B1 | 50 | 10.0 | 10.2 | 0.2 |
| 19 | 2 | A1 | 3 | B2 | 97 | 10.0 | 10.2 | 0.2 |
| 20 | 2 | A1 | 3 | B3 | 97 | 10.0 | 9.9 | 0.1 |
| 21 | 2 | A1 | 3 | B4 | 97 | 10.0 | 10.1 | 0.1 |
| 22 | 2 | A13 | 3 | B1 | 97 | 10.0 | 10.2 | 0.2 |
| 23 | 2 | A14 | 3 | B1 | 97 | 10.0 | 10.2 | 0.2 |
| 24 | 2 | A15 | 3 | B1 | 97 | 10.0 | 10.2 | 0.2 |
| 25 | 2 | A16 | 3 | B1 | 97 | 10.0 | 10.2 | 0.2 |

TABLE 4-continued

| Magnetic carrier | Magnetic core | Silicone-modified resin Type | Mixing ratio (% by mass) | Resin B Type | Mixing ratio (% by mass) | SP value SPa | SPb | \|SPa − SPb\| |
|---|---|---|---|---|---|---|---|---|
| 26 | 2 | A17 | 3 | B1 | 97 | 10.0 | 10.2 | 0.2 |
| 27 | 2 | A1 | 3 | B5 | 97 | 10.0 | 9.3 | 0.7 |
| 28 | 2 | A1 | 3 | B6 | 97 | 10.0 | 11.4 | 1.4 |
| 29 | 2 | C1 | 3 | B1 | 97 | 11.6 | 10.2 | 1.4 |
| 30 | 2 | C2 | 3 | B1 | 97 | 11.6 | 10.2 | 1.4 |
| 31 | 2 | C3 | 3 | B1 | 97 | 11.3 | 10.2 | 1.1 |
| 32 | 2 | A1 + C1 | 1.54 + 1.5 | B1 | 97 | 10.8 | 10.2 | 0.6 |
| 33 | 2 | — | 0 | B1 | 100 | 10.0 | 10.2 | 0.2 |
| 34 | 2 | A1 | 100 | B1 | 0 | 10.0 | 10.2 | 0.2 |
| 35 | 2 | C1 | 100 | B1 | 0 | 11.6 | 10.2 | 1.4 |
| 36 | 2 | A1 | 3 | B7 | 97 | 10.0 | 9.2 | 0.8 |
| 37 | 2 | A18 | 3 | B1 | 97 | 10.0 | 10.2 | 0.2 |
| 38 | 2 | A19 | 3 | B1 | 97 | 10.0 | 10.2 | 0.2 |

TABLE 5

| Magnetic carrier | S0 | S10 | S20 | S30 | S40 | S50 | C0 | C20 | S20/S0 | S0/C0 | S20/C20 |
|---|---|---|---|---|---|---|---|---|---|---|---|
| 1 | 3.62 | 1.05 | 0.92 | 0.95 | 0.85 | 1.05 | 76.13 | 75.33 | 0.25 | 0.05 | 0.01 |
| 2 | 3.84 | 1.25 | 0.84 | 0.69 | 0.62 | 0.58 | 75.08 | 75.70 | 0.22 | 0.05 | 0.01 |
| 3 | 3.26 | 1.31 | 0.87 | 0.79 | 0.88 | 0.68 | 73.99 | 74.32 | 0.27 | 0.04 | 0.01 |
| 4 | 3.65 | 1.24 | 0.86 | 0.81 | 0.72 | 0.73 | 74.33 | 74.52 | 0.24 | 0.05 | 0.01 |
| 5 | 3.46 | 1.19 | 0.74 | 0.72 | 0.68 | 0.63 | 74.86 | 74.98 | 0.21 | 0.05 | 0.01 |
| 6 | 2.94 | 1.08 | 0.68 | 0.59 | 0.72 | 0.98 | 72.53 | 73.30 | 0.23 | 0.04 | 0.01 |
| 7 | 3.44 | 1.19 | 0.86 | 0.75 | 0.77 | 0.62 | 75.16 | 75.82 | 0.25 | 0.05 | 0.01 |
| 8 | 2.82 | 0.96 | 0.78 | 0.76 | 0.93 | 0.95 | 73.22 | 72.24 | 0.28 | 0.04 | 0.01 |
| 9 | 2.61 | 1.00 | 0.89 | 0.80 | 0.71 | 0.63 | 73.81 | 75.93 | 0.34 | 0.04 | 0.01 |
| 10 | 2.54 | 0.90 | 0.80 | 0.86 | 0.90 | 0.79 | 72.47 | 74.61 | 0.31 | 0.04 | 0.01 |
| 11 | 2.22 | 0.82 | 0.69 | 0.69 | 0.51 | 0.87 | 74.34 | 74.59 | 0.31 | 0.03 | 0.01 |
| 12 | 2.13 | 0.67 | 0.55 | 0.68 | 0.71 | 0.51 | 72.06 | 74.07 | 0.26 | 0.03 | 0.01 |
| 13 | 3.18 | 1.16 | 0.89 | 0.77 | 0.62 | 0.67 | 73.02 | 72.16 | 0.28 | 0.04 | 0.01 |
| 14 | 3.28 | 1.03 | 0.91 | 0.78 | 0.67 | 0.67 | 72.23 | 73.92 | 0.28 | 0.05 | 0.01 |
| 15 | 1.43 | 0.77 | 0.21 | 0.32 | 0.23 | 0.25 | 75.21 | 70.73 | 0.15 | 0.02 | 0.00 |
| 16 | 8.58 | 3.69 | 2.86 | 2.08 | 1.62 | 1.72 | 60.67 | 66.46 | 0.33 | 0.14 | 0.04 |
| 17 | 10.87 | 5.56 | 3.52 | 2.14 | 2.01 | 1.81 | 55.56 | 61.99 | 0.32 | 0.20 | 0.06 |
| 18 | 14.80 | 6.86 | 4.83 | 4.56 | 3.14 | 2.63 | 48.13 | 61.83 | 0.33 | 0.31 | 0.08 |
| 19 | 3.63 | 1.40 | 0.90 | 0.72 | 0.52 | 0.61 | 75.55 | 75.68 | 0.25 | 0.05 | 0.01 |
| 20 | 3.58 | 1.11 | 0.70 | 0.69 | 0.85 | 0.54 | 75.69 | 75.32 | 0.20 | 0.05 | 0.01 |
| 21 | 3.46 | 1.27 | 0.97 | 0.72 | 0.62 | 0.65 | 76.00 | 75.33 | 0.28 | 0.05 | 0.01 |
| 22 | 3.81 | 1.32 | 0.86 | 0.86 | 0.74 | 0.84 | 76.36 | 75.54 | 0.23 | 0.05 | 0.01 |
| 23 | 7.54 | 4.13 | 2.13 | 1.68 | 1.32 | 1.13 | 58.69 | 67.94 | 0.28 | 0.13 | 0.03 |
| 24 | 8.18 | 5.13 | 3.46 | 2.54 | 2.12 | 1.86 | 57.77 | 65.11 | 0.42 | 0.14 | 0.05 |
| 25 | 1.03 | 0.76 | 0.83 | 0.67 | 0.57 | 0.52 | 76.59 | 75.29 | 0.81 | 0.01 | 0.01 |
| 26 | 14.98 | 8.22 | 4.68 | 3.56 | 2.83 | 2.42 | 49.63 | 57.34 | 0.31 | 0.30 | 0.08 |
| 27 | 7.22 | 0.69 | 0.15 | 0.16 | 0.16 | 0.20 | 72.06 | 70.73 | 0.02 | 0.10 | 0.00 |
| 28 | 8.44 | 0.74 | 0.16 | 0.26 | 0.25 | 0.19 | 75.21 | 73.92 | 0.02 | 0.11 | 0.00 |
| 29 | 3.44 | 0.78 | 0.23 | 0.24 | 0.29 | 0.21 | 74.69 | 71.44 | 0.07 | 0.05 | 0.00 |
| 30 | 3.89 | 0.64 | 0.31 | 0.28 | 0.43 | 0.27 | 75.01 | 73.49 | 0.08 | 0.05 | 0.00 |
| 31 | 2.87 | 0.51 | 0.21 | 0.22 | 0.22 | 0.28 | 75.51 | 74.18 | 0.07 | 0.04 | 0.00 |
| 32 | 4.27 | 0.99 | 0.71 | 0.56 | 0.58 | 0.37 | 73.29 | 72.66 | 0.17 | 0.06 | 0.01 |
| 33 | 0.74 | 0.64 | 0.91 | 0.71 | 1.31 | 1.31 | 79.05 | 72.44 | 1.23 | 0.01 | 0.01 |
| 34 | 20.84 | 20.41 | 20.69 | 21.83 | 22.41 | 22.11 | 41.22 | 40.81 | 0.99 | 0.51 | 0.51 |
| 35 | 18.74 | 19.27 | 19.14 | 20.46 | 20.16 | 20.31 | 28.89 | 31.07 | 1.02 | 0.65 | 0.62 |
| 36 | 23.50 | 0.96 | 0.92 | 0.74 | 0.81 | 0.79 | 40.77 | 68.10 | 0.04 | 0.58 | 0.01 |
| 37 | 21.42 | 22.31 | 21.96 | 21.47 | 21.93 | 22.30 | 35.92 | 31.85 | 1.03 | 0.60 | 0.69 |
| 38 | 0.93 | 0.31 | 0.23 | 0.18 | 0.21 | 0.22 | 74.32 | 71.94 | 0.25 | 0.01 | 0.00 |

Production Example of Toner 1

The following materials were prepared.

| | |
|---|---|
| Crystalline polyester resin 1 | 100 parts by mass |
| Fischer-Tropsch wax (which exhibits a maximum exothermic peak temperature of 90° C.) | 4 parts by mass |
| 3,5-di-t-butylsalicylic acid aluminum compound (Trade name: Bontron E88, manufactured by Orient Chemical Industries Co., Ltd.) | 0.3 parts by mass |
| Carbon black | 10 parts by mass |

These materials were mixed by using Henschel mixer (Trade name: FM-75 type, manufactured by Mitsui Mining Co., Ltd.) at a rotation speed of 1500 rpm and a rotation time of 5 minutes, and then kneaded by a twin-screw kneader (Trade name: PCM-30 type, manufactured by Ikegai Corporation) adjusted to a temperature of 130° C. The obtained kneaded product was cooled and coarsely pulverized into 1 mm or less with a hammer mill to obtain a coarsely pulverized product. The obtained coarsely pulverized product was finely pulverized by a mechanical pulverizer (Trade name: T-250, manufactured by Turbo Kogyo Co., Ltd.) Furthermore, the finely pulverized product was classified using Faculty F-300 (manufactured by Hosokawa Micron Corporation) to obtain a toner base particle. The operating conditions of Faculty F-300 were that the rotation speed of the classification rotor was 11000 rpm and the rotation speed of the dispersion rotor was 7200 rpm.

Subsequently, the following materials were prepared.

| | |
|---|---|
| Toner base particle obtained above | 100 parts by mass |
| Silica fine particle A (having a number average particle diameter (D1) of 120 nm) | 2.0 parts by mass |

These materials were mixed by using Henschel mixer (Product name: FM-10C type, manufactured by Mitsui Mining Co., Ltd.) at a rotation speed of 1900 rpm and a rotation time of 3 minutes, and then heat-treated by a surface treatment apparatus shown in FIG. 1 to obtain a heat-treated toner particle. The operating conditions of the surface treatment apparatus were as follows: feed rate=5 kg/hr, hot air temperature C=160° C., hot air flow rate=6 m$^3$/min., cold air temperature E=−5° C., cold air flow rate=4 m$^3$/min., blower air flow rate=20 m$^3$/min., injection air flow rate=1 m$^3$/min. The operating conditions of an inertial classification system Elbow-Jet Air Classifier (manufactured by Nittetsu Mining Co., Ltd.) were adjusted so that a heat-treated toner particle having a desired particle size and particle size distribution can be obtained by classifying the obtained heat-treated toner particles.

Subsequently, the following materials were prepared.

| | |
|---|---|
| Heat-treated toner particle obtained above | 100 parts by mass |
| Silica fine particle B (having a number average particle diameter (D1) of 20 nm) | 0.6 parts by mass |

These materials were mixed by Henschel mixer (Trade name: FM-75 type, manufactured by Mitsui Miike Chemical Engineering Machinery Co., Ltd.) at a rotation speed of 1900 rpm and a rotation time of 3 minutes to obtain a toner.

Example 1

To 91 parts by mass of the magnetic carrier 1, 9 parts by mass of the toner obtained above was added, and the mixture was shaken by a shaker (Trade name: YS-8D type, manufactured by YAYOI Co., Ltd.) to prepare 300 g of a two-component developer. The shaking condition of the shaker was 150 rpm for 2 minutes. On the other hand, 90 parts by mass of the toner obtained above was added to 10 parts by mass of the magnetic carrier 1, and the mixture was mixed for 5 minutes by V-type mixer in an environment of normal temperature and normal humidity 23° C./50% RH, thereby obtaining a replenishment developer.

The following evaluation was performed using the two-component developer and the replenishment developer. A modified machine of a color copying machine (Trade name: imageRUNNER ADVANCE C5560, manufactured by Canon Inc.) was used as an image forming apparatus. The two-component developer was put in respective color developing units, a replenishment developer container including the replenishment developer for respective colors was placed, thereafter an image was formed and subjected to various evaluations before and after a durability test.

In the durability test, a chart of FFH output with an image ratio of 1% was used under a printing environment of a temperature of 23° C./a humidity of 5% RH (hereinafter, "N/L"). In the durability test under a printing environment of a temperature of 30° C. and a humidity of 80% RH (hereinafter, "H/H"), a chart of FFH output with an image ratio of 40% was used. FFH is a value indicating 256 tone numbers in 16 digits, 00h is the first tone number (white portion) in 256 tone numbers, and FFH is the 256th tone number (solid portion) in 256 tone numbers.

The image output quantity was changed according to respective evaluation items.

The durability test conditions were as follows.

Paper: Laser beam printer paper CS-814 (81.4 g/m$^2$) (manufactured by Canon Marketing Japan Inc.)

Image forming speed: The machine was modified to be able to output 80 full colored sheets in A4 size per minute.

Developing conditions: The machine was modified so that a developing contrast was able be adjusted to an intended value, and an automatic correction was not activated by the main body. The modification was made so that the peak-to-peak voltage (Vpp) of the alternating electric field was able to be changed from 0.7 kV to 1.8 kV in an increment of 0.1 kV at a frequency of 2.0 kHz. The modification was made to be able to output a monochromatic image for each color.

The evaluation items are shown below.

(1) Image Density

A solid image (FFH) was outputted at the initial stage of the durability test and after the durability test (to output 50,000 sheets of A4 landscape image with 40% printing ratio) had been performed in a high temperature and high humidity environment (30° C., 80% RH). The density of the formed solid image was measured by a densitometer X-Rite 404A (manufactured by X-Rite Inc.), and an average value of the densities was taken from 6 points and was defined as an image density. The difference in the image density between the initial stage of the test and after the image output of the durability test was evaluated based on the following criteria.

A: Difference in density is less than 0.10
B: Difference in density is 0.10 or more and less than 0.15
C: Difference in density is 0.15 or more and less than 0.20
D: Difference in density is 0.20 or more and less than 0.25
E: Difference in density is 0.20 or more and less than 0.30

(2) Fogging

An A4 full solid white image was outputted at the initial stage of the durability test and after the durability test (to output 50,000 sheets of A4 landscape with 40% printing ratio) had been performed under a high-temperature and high-humidity environment (30° C., 80% RH). The whiteness of a white portion was measured with a reflectometer (manufactured by Tokyo Denshoku Co., Ltd.), a fog density (%) was calculated from the difference in the whiteness before and after transfer, and the fogging was evaluated based on the following criteria.

A: Less than 1.0%
B: 1.0% or more and less than 1.5%
C: 1.5% or more and less than 2.0%
D: 2.0% or more and less than 2.5%
E: 2.0% or more and less than 2.5%

(3) Developability of Halftone Image

One piece of halftone image (30H) in A4 was printed at the initial stage of the durability test and after the durability test (to output 50,000 sheets of A4 landscape with 40% printing ratio) had been performed in a high temperature and high humidity environment (30° C., 80% RH). An area of 1000 dots was measured for the obtained halftone image by using a digital microscope VHX-500 (Trade name: Lens Wide-range zoom lens VH-Z 100, manufactured by KEYENCE CORPORATION). The number average (S) of the dot areas and the standard deviation (σ) of the dot areas were calculated, and a dot reproduction index (I) was calculated by the following equation.

Dot reproduction index $(I)=\sigma/S \times 100$

The roughness of the halftone image was evaluated based on the following criteria.
A: I is less than 4.0
B: I is 4.0 or more and less than 5.0
C: I is 5.0 or more and less than 6.0
D: I is 7.0 or more and less than 8.0.
E: I is 8.0 or more and less than 9.0.

(4) Toner Scattering

The developing unit was taken out from the main body, and the condition of the toner scattering inside and outside the developing unit and the main body was visually checked at the initial stage of the durability test and after the durability test (to output 50,000 sheets of A4 landscape with 40% printing ratio) had been performed in a high-temperature and high-humidity environment (30° C., 80% RH), and the evaluation was made based on the following criteria.
A: No scattering of toner
B: Very slight scattering of toner
C: Slight scattering of toner
D: Toner scattering is present
E: Significant scattering of toner Examples 2 to 32 and Comparative Examples 1 to 6

The evaluations for Examples 2 to 32 and Comparative Examples 1 to 6 were made in the same manner as for Example 1 except that the types of the magnetic carriers used were changed to those shown in Table 6. The evaluation results are shown in Table 6.

TABLE 6

| Example/ Comparative example | Magnetic carrier | Image density Difference in density | Evaluation | Fogging Fog density | Evaluation | Developability Roughness | Evaluation | Toner scattering Evaluation |
|---|---|---|---|---|---|---|---|---|
| Example 1 | 1 | 0.02 | A | 0.2 | A | 2.5 | A | A |
| Example 2 | 2 | 0.04 | A | 0.6 | A | 2.8 | A | A |
| Example 3 | 3 | 0.03 | A | 0.3 | A | 2.6 | A | A |
| Example 4 | 4 | 0.02 | A | 0.8 | A | 2.7 | A | A |
| Example 5 | 5 | 0.02 | A | 0.3 | A | 2.6 | A | A |
| Example 6 | 6 | 0.05 | A | 0.8 | A | 3.0 | A | A |
| Example 7 | 7 | 0.03 | A | 0.3 | A | 2.6 | A | A |
| Example 8 | 8 | 0.07 | A | 1.1 | B | 3.2 | A | A |
| Example 9 | 9 | 0.07 | A | 1.2 | B | 3.5 | A | A |
| Example 10 | 10 | 0.05 | A | 1.4 | B | 3.0 | A | A |
| Example 11 | 11 | 0.09 | A | 1.3 | B | 4.2 | B | A |
| Example 12 | 12 | 0.08 | A | 1.4 | B | 4.6 | B | A |
| Example 13 | 13 | 0.12 | B | 1.1 | B | 4.2 | B | B |
| Example 14 | 14 | 0.12 | B | 1.2 | B | 4.1 | B | C |
| Example 15 | 15 | 0.13 | B | 1.3 | B | 4.8 | B | C |
| Example 16 | 16 | 0.13 | B | 1.4 | B | 4.9 | B | C |
| Example 17 | 17 | 0.12 | B | 1.7 | C | 4.9 | B | C |
| Example 18 | 18 | 0.11 | B | 1.9 | C | 5.3 | C | C |
| Example 19 | 19 | 0.02 | A | 0.4 | A | 3.8 | A | B |
| Example 20 | 20 | 0.03 | A | 0.2 | A | 4.1 | B | B |
| Example 21 | 21 | 0.03 | A | 1.3 | B | 3.6 | A | A |
| Example 22 | 22 | 0.08 | A | 0.9 | A | 3.8 | A | B |
| Example 23 | 23 | 0.14 | B | 1.4 | B | 4.8 | B | B |
| Example 24 | 24 | 0.13 | B | 1.3 | B | 4.8 | B | C |
| Example 25 | 25 | 0.17 | C | 1.8 | C | 5.1 | C | C |
| Example 26 | 26 | 0.16 | C | 1.8 | C | 5.6 | C | C |
| Example 27 | 27 | 0.18 | C | 1.7 | C | 4.7 | B | C |
| Example 28 | 28 | 0.19 | C | 1.7 | C | 5.3 | C | C |
| Example 29 | 29 | 0.11 | B | 1.4 | B | 4.3 | B | B |
| Example 30 | 30 | 0.14 | B | 1.1 | B | 3.8 | A | C |
| Example 31 | 31 | 0.11 | B | 1.3 | B | 5.0 | C | B |
| Example 32 | 32 | 0.08 | A | 1.2 | B | 4.2 | B | A |
| Comparative example 1 | 33 | 0.16 | C | 3.2 | E | 5.7 | C | E |
| Comparative example 2 | 34 | 0.15 | C | 1.6 | C | 7.8 | E | E |
| Comparative example 3 | 35 | 0.17 | C | 2.2 | D | 7.5 | E | E |
| Comparative example 4 | 36 | 0.17 | C | 2.3 | D | 6.3 | D | E |
| Comparative example 5 | 37 | 0.31 | E | 1.8 | C | 5.5 | C | E |
| Comparative example 6 | 38 | 0.17 | C | 3.6 | E | 7.9 | E | E |

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-012506, filed Jan. 28, 2021, and Japanese Patent Application No. 2021-206050, filed Dec. 20, 2021, which are hereby incorporated by reference herein in their entirety.

What is claimed is:

1. A magnetic carrier comprising:
a magnetic core; and
a resin coating layer which coats a surface of the magnetic core,
wherein the resin coating layer has a thickness of 50 nm or more, and
a coating resin, which forms the resin coating layer, contains a resin S having an organosilicon polymer moiety, and
when a ratio of an amount of silicon element to a sum total of an amount of nitrogen element, an amount of silicon element, an amount of fluorine element, an amount of carbon element, an amount of titanium element, an amount of strontium element, an amount of tin element, an amount of aluminum element, and an amount of oxygen element as determined when a surface of the magnetic carrier is analyzed by X-ray photoelectron spectroscopy is denoted by S0 (atomic percentage), S0 is 1.0 or more and 15.0 or less, and
when a ratio of an amount of silicon element to a sum total of an amount of nitrogen element, an amount of silicon element, an amount of fluorine element, an amount of carbon element, an amount of titanium element, an amount of strontium element, an amount of tin element, an amount of aluminum element, and an amount of oxygen element as determined when a position at a depth of 20 nm from a surface of the magnetic carrier is analyzed by X-ray photoelectron spectroscopy is denoted by S20 (atomic percentage), S20 is 0.0 or more and 5.0 or less.

2. The magnetic carrier according to claim 1, wherein a ratio of S20 to S0 is 0.8 or less.

3. The magnetic carrier according to claim 1, wherein when a ratio of an amount of carbon element to a sum total of an amount of nitrogen element, an amount of silicon element, an amount of fluorine element, an amount of carbon element, an amount of titanium element, an amount of strontium element, an amount of tin element, an amount of aluminum element, and an amount of oxygen element as determined when a surface of the magnetic carrier is analyzed by X-ray photoelectron spectroscopy is denoted by C0 (atomic percentage), a ratio of S0 to C0 is 0.020 or more and 0.20 or less, and
when a ratio of an amount of carbon element to a sum total of an amount of nitrogen element, an amount of silicon element, an amount of fluorine element, an amount of carbon element, an amount of titanium element, an amount of strontium element, an amount of tin element, an amount of aluminum element, and an amount of oxygen element as determined when a position at a depth of 20 nm from the surface of the magnetic carrier is analyzed by X-ray photoelectron spectroscopy is denoted by C20 (atomic percentage), a ratio of S20 to C20 is 0.0 or more and 0.060 or less.

4. The magnetic carrier according to claim 1, wherein when a ratio of an amount of silicon element to a sum of an amount of nitrogen element, an amount of silicon element, an amount of fluorine element, an amount of carbon element, an amount of titanium element, an amount of strontium element, an amount of tin element, an amount of aluminum element, and an amount of oxygen element as determined when a position at a depth of 10 nm from a surface from a surface of the magnetic carrier is analyzed by X-ray photoelectron spectroscopy is denoted by S10 (atomic percentage), S10 is 0.0 or more and 5.0 or less.

5. The magnetic carrier according to claim 1, wherein S0 is 1.5 or more and 15.0 or less, and
S20 is 0.0 or more and 2.0 or less.

6. The magnetic carrier according to claim 1,
wherein when a ratio of an amount of silicon element to a sum total of an amount of nitrogen element, an amount of silicon element, an amount of fluorine element, an amount of carbon element, an amount of titanium element, an amount of strontium element, an amount of tin element, an amount of aluminum element, and an amount of oxygen element as determined when a position at a depth of 30 nm from a surface of the magnetic carrier is analyzed by X-ray photoelectron spectroscopy is denoted by S30 (atomic percentage), S30 is 0.0 or more and 2.0 or less, and
when a ratio of an amount of silicon element to a sum total of an amount of nitrogen element, an amount of silicon element, an amount of fluorine element, an amount of carbon element, an amount of titanium element, an amount of strontium element, an amount of tin element, an amount of aluminum element, and an amount of oxygen element as determined when a position at a depth of 40 nm from a surface of the magnetic carrier is analyzed by X-ray photoelectron spectroscopy is denoted by S40 (atomic percentage), S40 is 0.0 or more and 2.0 or less, and
when a ratio of an amount of silicon element to a sum total of an amount of nitrogen element, an amount of silicon element, an amount of fluorine element, an amount of carbon element, an amount of titanium element, an amount of strontium element, an amount of tin element, an amount of aluminum element and an amount of oxygen element as determined when a position at a depth of 50 nm from a surface of the magnetic carrier is analyzed by X-ray photoelectron spectroscopy is denoted by S50 (atomic percentage), S50 is 0.0 or more and 2.0 or less.

7. The magnetic carrier according to claim 1, wherein a content percentage of the resin S in the coating resin is 1% by mass or more and 50% by mass or less.

8. The magnetic carrier according to claim 1, wherein the coating resin contains at least a resin A as the resin S, and the resin A has a unit Y1 represented by formula (1) and a unit Y2 represented by formula (2),

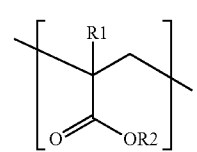

(1)

in formula (1), R1 represents H or CH$_3$, R2 represents a hydrocarbon group having 1 to 6 carbon atoms which may have a substituent, and the substituent is a hydroxy group or a carboxy group,

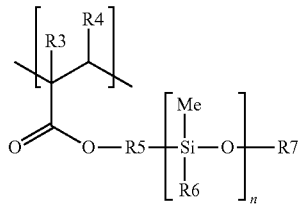

(2)

in formula (2), R3 and R4 each independently represent H or CH$_3$, R5 represents a single bond or a hydrocarbon group having a carbon number of 1 or more and 10 or less, R6 represents a hydrocarbon group having a carbon number of 1 or more and 10 or less, R7 represents H, CH$_3$ or Si(CH$_3$)$_3$, and n represents an integer of 2 or more and 150 or less, when a mass of the resin A is denoted by X, a mass of the unit Y1 is denoted by y1, and a mass of the unit Y2 is denoted by y2, a ratio of a sum of y1 and y2 to X is 0.90 or more and 1.00 or less, and a ratio of y1 to y2 is 1.00 or more and 30.0 or less.

9. The magnetic carrier according to claim 8, wherein the coating resin further contains a resin B, when the resin B has the unit Y2, a content percentage of the unit Y2 in the resin B is 0.1% by mass or less, a content percentage of the resin B in the coating resin is 50% by mass or more and 99% by mass or less, and when an SP value of the unit Y1 is denoted by SPa and an SP value of the resin B is denoted by SPb, an absolute value of the difference between SPa and SPb is 0.0 or more and 2.0 or less.

10. The magnetic carrier according to claim 9, wherein the resin B contains the unit Y1 in a percentage of 75% by mass or more.

11. The magnetic carrier according to claim 1, wherein the coating resin contains at least a resin C as the resin S, and the resin C is a silicone-modified block polymer having at least one moiety selected from the group consisting of moieties represented by formulae (3) to (6),

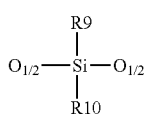

(3)

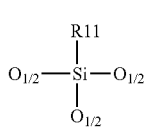

(4)

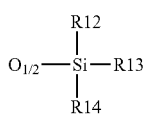

(5)

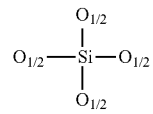

(6)

in formulae (3) to (6), R9 to R14 each represent a hydrogen atom, an alkyl group having 1 or more and 4 or less carbon atoms, an alkoxy group having 1 or more and 4 or less carbon atoms, a phenyl group, a phenoxy group, an alkenyl group having 2 or more and 4 or less carbon atoms, or an alkenyloxy group having 2 or more and 4 or less carbon atoms, and —O$_{1/2}$ represents a sharing of O between adjacent Si atoms, and a total content percentage of the moieties represented by formulae (3) to (6) in the resin C is 10% by mass or more and 40% by mass or less.

12. A two-component developer comprising:
a magnetic carrier; and
a toner,
the magnetic carrier comprising:
   a magnetic core; and
   a resin coating layer which coats a surface of the magnetic core,
wherein the resin coating layer has a thickness of 50 nm or more, and
a coating resin, which forms the resin coating layer, contains a resin S having an organosilicon polymer moiety, and
when a ratio of an amount of silicon element to a sum total of an amount of nitrogen element, an amount of silicon element, an amount of fluorine element, an amount of carbon element, an amount of titanium element, an amount of strontium element, an amount of tin element, an amount of aluminum element, and an amount of oxygen element as determined when a surface of the magnetic carrier is analyzed by X-ray photoelectron spectroscopy is denoted by S0 (atomic percentage), S0 is 1.0 or more and 15.0 or less, and
when a ratio of an amount of silicon element to a sum total of an amount of nitrogen element, an amount of silicon element, an amount of fluorine element, an amount of carbon element, an amount of titanium element, an amount of strontium element, an amount of tin element, an amount of aluminum element, and an amount of oxygen element as determined when a position at a depth of 20 nm from a surface of the magnetic carrier is analyzed by X-ray photoelectron spectroscopy is denoted by S20 (atomic percentage), S20 is 0.0 or more and 5.0 or less.

13. A replenishment developer comprising:
a magnetic carrier; and
a toner,
the magnetic carrier comprising:
   a magnetic core; and
   a resin coating layer which coats a surface of the magnetic core,
wherein the resin coating layer has a thickness of 50 nm or more, and
a coating resin, which forms the resin coating layer, contains a resin S having an organosilicon polymer moiety, and
when a ratio of an amount of silicon element to a sum total of an amount of nitrogen element, an amount of silicon element, an amount of fluorine element, an amount of carbon element, an amount of titanium element, an amount of strontium element, an amount of tin element, an amount of aluminum element, and an amount of oxygen element as determined when a surface of the magnetic carrier is analyzed by X-ray photoelectron spectroscopy is denoted by S0 (atomic percentage), S0 is 1.0 or more and 15.0 or less, and when a ratio of an amount of silicon element to a sum total of an amount of nitrogen element, an amount of silicon element, an amount of fluorine element, an amount of carbon element, an amount of titanium element, an amount of strontium element, an amount of tin element, an amount of aluminum element, and an amount of oxygen element as determined when a position at a depth of 20 nm from a surface of the magnetic carrier is analyzed by X-ray photoelectron spectroscopy is denoted by S20 (atomic percentage), S20 is 0.0 or more and 5.0 or less.

* * * * *